(12) United States Patent
Haraguchi et al.

(10) Patent No.: US 11,858,287 B2
(45) Date of Patent: Jan. 2, 2024

(54) IMAGE FORMING SYSTEM

(71) Applicants: Yohsuke Haraguchi, Kanagawa (JP); Tomohiro Furuhashi, Kanagawa (JP); Wataru Takahashi, Tokyo (JP); Sho Asano, Kanagawa (JP); Yoshito Suzuki, Chiba (JP); Shinya Monma, Kanagawa (JP); Joji Akiyama, Kanagawa (JP); Wataru Nozaki, Kanagawa (JP)

(72) Inventors: Yohsuke Haraguchi, Kanagawa (JP); Tomohiro Furuhashi, Kanagawa (JP); Wataru Takahashi, Tokyo (JP); Sho Asano, Kanagawa (JP); Yoshito Suzuki, Chiba (JP); Shinya Monma, Kanagawa (JP); Joji Akiyama, Kanagawa (JP); Wataru Nozaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/847,523

(22) Filed: Jun. 23, 2022

(65) Prior Publication Data
US 2023/0001731 A1 Jan. 5, 2023

(30) Foreign Application Priority Data
Jun. 30, 2021 (JP) .................. 2021-108736

(51) Int. Cl.
*B32B 41/00* (2006.01)
*B41M 7/00* (2006.01)
*B32B 37/14* (2006.01)

(52) U.S. Cl.
CPC ......... *B41M 7/0027* (2013.01); *B32B 37/142* (2013.01); *B32B 41/00* (2013.01);
(Continued)

(58) Field of Classification Search
CPC .... B41M 7/0027; B32B 37/142; B32B 41/00; B32B 2309/02; B32B 2309/105;
(Continued)

(56) References Cited

U.S. PATENT DOCUMENTS

| | | |
|---|---|---|
| 2015/0031520 A1 | 1/2015 | Nakada et al. |
| 2016/0340145 A1 | 11/2016 | Kunieda et al. |

(Continued)

FOREIGN PATENT DOCUMENTS

| | | |
|---|---|---|
| JP | 62-113182 | 5/1987 |
| JP | 9-164593 | 6/1997 |

(Continued)

*Primary Examiner* — Michael N Orlando
*Assistant Examiner* — Joshel Rivera
(74) *Attorney, Agent, or Firm* — Harness, Dickey & Pierce, P.L.C.

(57) ABSTRACT

An image forming system includes a sheet processing apparatus, a heat presser, an image forming apparatus, and control circuitry. The sheet processing apparatus separates a two-ply sheet in which two sheets are overlaid and bonded together at a portion of the two-ply sheet, and sandwiches a sheet medium between the sheets of the two-ply sheet. The heat presser heats and presses the two-ply sheet. The control circuitry performs a first mode to cause the sheet processing apparatus to sandwich the sheet medium, on which an image has been formed by the image forming apparatus, between the two sheets of the two-ply sheet and cause the heat presser to laminate the two-ply sheet, and a second mode to cause the heat presser to laminate a sheet set that includes the sheet medium sandwiched between the two sheets of the two-ply sheet by a user.

11 Claims, 20 Drawing Sheets

(52) U.S. Cl.
CPC ..... *B32B 2309/02* (2013.01); *B32B 2309/105* (2013.01); *B32B 2309/14* (2013.01)

(58) Field of Classification Search
CPC ................ B32B 2309/14; B32B 38/18; B32B 2037/0061; B65H 2701/193; B65H 2801/27; B65H 39/04; B65H 39/06; G03G 15/6582
USPC .................... 156/60, 64, 350, 351, 378, 379
See application file for complete search history.

(56) References Cited

U.S. PATENT DOCUMENTS

| | | | |
|---|---|---|---|
| 2019/0284012 A1 | 9/2019 | Yoneyama et al. |
| 2020/0338877 A1 | 10/2020 | Takahashi et al. |
| 2020/0341414 A1 | 10/2020 | Watanabe et al. |
| 2020/0407187 A1 | 12/2020 | Hidaka et al. |
| 2021/0039900 A1 | 2/2021 | Shimazu et al. |
| 2021/0039916 A1 | 2/2021 | Sugiyama et al. |
| 2021/0253385 A1 | 8/2021 | Suzuki et al. |
| 2021/0289090 A1 | 9/2021 | Monma et al. |
| 2021/0294249 A1 | 9/2021 | Takahashi et al. |
| 2021/0325804 A1 | 10/2021 | Furuhashi et al. |
| 2021/0333730 A1 | 10/2021 | Asano et al. |
| 2021/0347160 A1 | 11/2021 | Akiyama et al. |
| 2021/0347589 A1 | 11/2021 | Suzuki et al. |
| 2021/0354948 A1 | 11/2021 | Takahashi et al. |
| 2021/0356899 A1 | 11/2021 | Takahashi et al. |
| 2021/0387467 A1 | 12/2021 | Asano et al. |
| 2021/0403273 A1 | 12/2021 | Haraguchi et al. |
| 2021/0405571 A1 | 12/2021 | Nozaki et al. |
| 2022/0011712 A1 | 1/2022 | Asano et al. |

FOREIGN PATENT DOCUMENTS

| | | |
|---|---|---|
| JP | 2006-160429 | 6/2006 |
| JP | 2020-179584 | 11/2020 |

FIG. 28A

| SHEET FEED SETTING | | | |
|---|---|---|---|
| FILM-SHEET THICKNESS | THICK ⌄ | LAMINATION TEMPERATURE | HIGH ⌄ |
| INNER-SHEET THICKNESS | PLAIN SHEET ⌄ | LAMINATION SPEED | LOW ⌄ |
| FILM-SHEET SIZE | A4 ⌄ | | |

FINISH SETTING

FIG. 28B

| SHEET FEED SETTING (DETAILS) | | | |
|---|---|---|---|
| FILM-SHEET THICKNESS (µm) | 100 µm | LAMINATION TEMPERATURE (°C) | 100 °C |
| INNER-SHEET THICKNESS (BASIS WEIGHT) | 70 g/m² | LAMINATION SPEED | 100 mm/s |
| FILM-SHEET SIZE (VERTICAL) | 210 mm | | |
| FILM-SHEET SIZE (HORIZONTAL) | 297 mm | | |

FINISH SETTING

FIG. 28C

| SHEET FEED SETTING | | | |
|---|---|---|---|
| SHEET-SET THICKNESS | THICK ⌄ | LAMINATION TEMPERATURE | HIGH ⌄ |
| FILM-SHEET SIZE | A4 ⌄ | LAMINATION SPEED | LOW ⌄ |

FINISH SETTING

IMAGE FORMING SYSTEM

CROSS-REFERENCE TO RELATED APPLICATION

This patent application is based on and claims priority pursuant to 35 U.S.C. § 119(a) to Japanese Patent Application No. 2021-108736, filed on Jun. 30, 2021, in the Japan Patent Office, the entire disclosure of which is hereby incorporated by reference herein.

BACKGROUND

Technical Field

Embodiments of the present disclosure relate to an image forming system.

Related Art

As a post-processing apparatus of an image forming apparatus, there is known a technology in which a two-ply sheet (laminate film) in which two sheets are overlaid and bonded (or joined) at one side is fed and separated (or peeled), then a sheet fed from the image forming apparatus is sandwiched between the separated sheets of the two-ply sheet, and the two-ply sheet is laminated by heat pressing.

However, in the related art, since the two-ply sheet is separated in the post-processing apparatus and further an inner sheet (e.g., a sheet of paper or a photograph) is sandwiched between the separated sheets, the types and shapes of inner sheets that can be set into a two-ply sheet are limited to sheets that can be fed from a sheet feed tray or the image forming apparatus. In addition, in the related art, a post-processing apparatus does not have a function of feeding a sheet in which an inner sheet is set and simply performing heat pressing on the sheet, and does not substitute for a laminator that performs only heat pressing.

SUMMARY

According to an embodiment of the present disclosure, an image forming system that includes a sheet processing apparatus, a heat presser, an image forming apparatus, and control circuitry. The sheet processing apparatus separates a two-ply sheet in which two sheets are overlaid and bonded together at a portion of the two-ply sheet, and sandwiches a sheet medium between the sheets of the two-ply sheet. The heat presser heats and presses the two-ply sheet. The image forming apparatus forms an image on the sheet medium. The control circuitry performs a first mode to cause the sheet processing apparatus to sandwich the sheet medium, on which an image has been formed by the image forming apparatus, between the two sheets of the two-ply sheet and cause the heat presser to laminate the two-ply sheet, and a second mode to cause the heat presser to laminate a sheet set that includes the sheet medium sandwiched between the two sheets of the two-ply sheet by a user.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 28A, 28B, and 28C are diagrams illustrating an operation panel serving as an operation device to allow a user to perform sheet feed setting;

Figure 1:
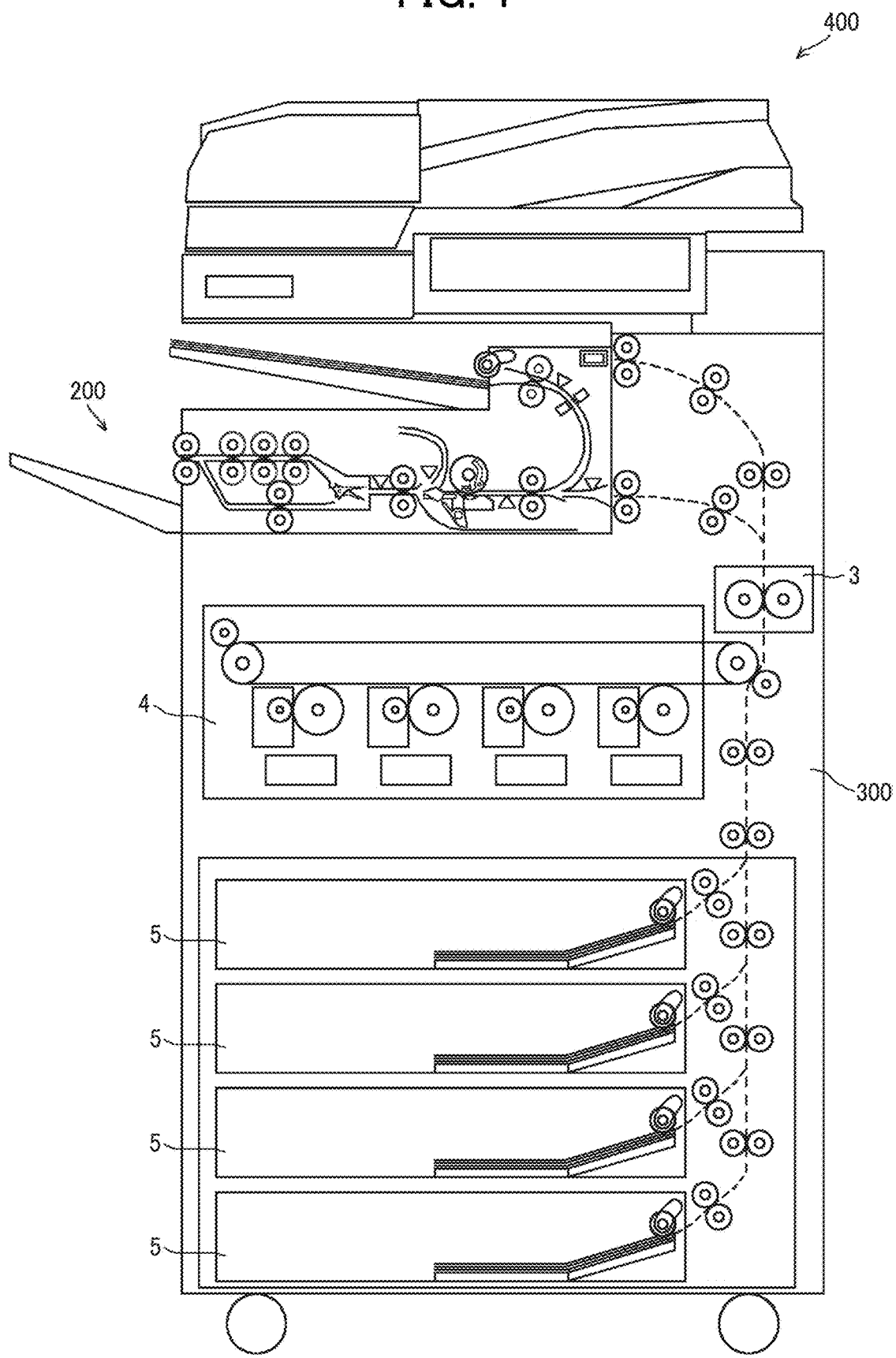
FIG. 1 is a schematic diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a schematic diagram illustrating an overall configuration of an image forming system according to an embodiment of the present disclosure. An image forming system 400 according to the present embodiment includes a sheet laminator 200 inside a body of an image forming apparatus 300.

The image forming apparatus 300 mainly includes a plurality of feeding units 5 that load and convey recording media, an image forming unit 4 as an image forming device that forms an image on a recording medium, and a heat fixing unit 3 that fixes the formed image on the recording medium.

In the image forming system 400, an inner sheet to be inserted into a lamination sheet can be fed from the image forming apparatus 300 or from a sheet feed tray of the sheet laminator 200. Accordingly, a desired image can be inserted in an in-line manner by a method utilizing copying or printing onto the inner sheet.

Figure 2:
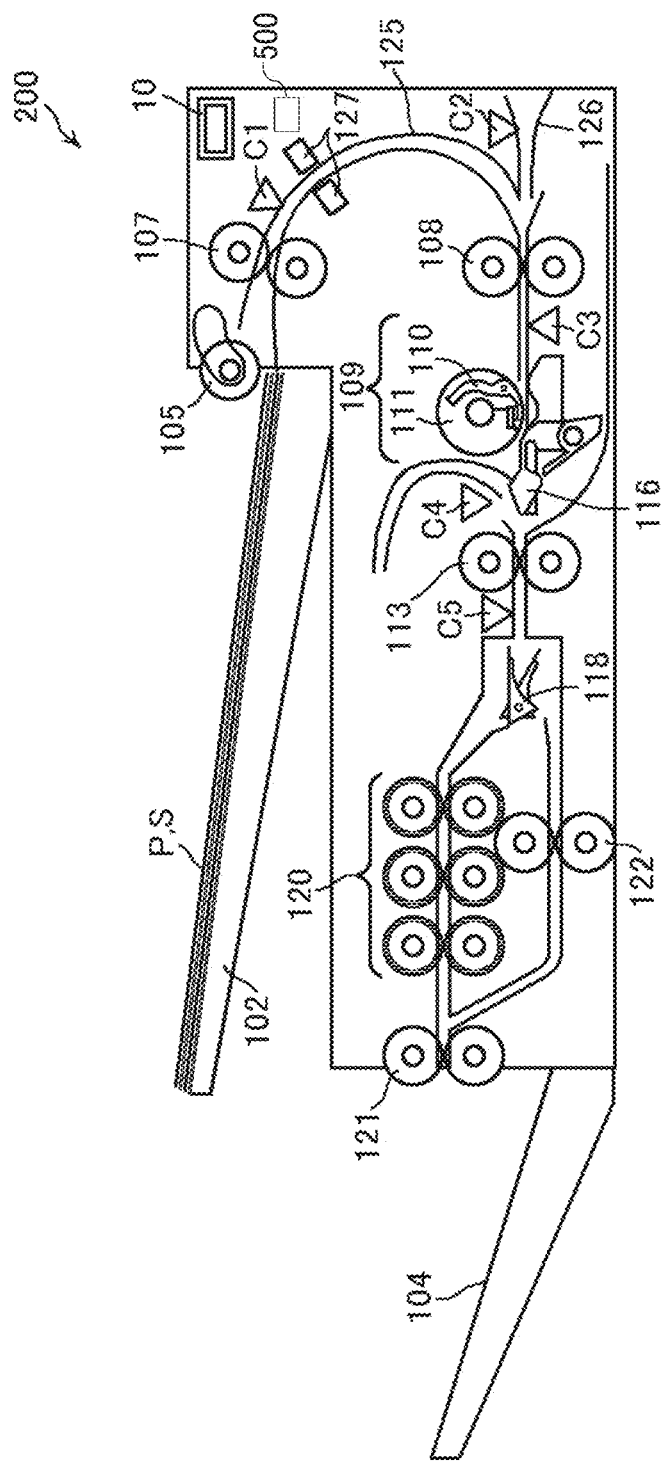
FIG. 2 is a schematic diagram illustrating an overall configuration of a sheet laminator according to an embodiment of the present disclosure.

FIG. 2 is a schematic view illustrating an overall configuration of a sheet laminator according to an embodiment of the present disclosure. The sheet laminator 200 according to the present embodiment is to separate a two-ply sheet (hereinafter referred to as a lamination sheet S) from each other, insert and sandwich a sheet medium (hereinafter referred to as an inner sheet P) into and between separated pieces of the lamination sheet S, and applies heat and pressure to the lamination sheet S to bond the lamination sheet S.

The lamination sheet S is a two-ply sheet constructed of two overlapping sheets (plies) and bonded (or joined) at one portion (or on one side). For example, there is a two-ply sheet in which a first side is a transparent sheet such as a transparent polyester sheet and the opposite side is a transparent or opaque sheet and bonded to the other sheet on one side thereof. The two-ply sheet also includes a lamination film.

The insertion sheet P is an example of a sheet medium that is inserted into the two-ply sheet. Examples of the sheet medium include thick paper, postcards, envelopes, plain paper, thin paper, coated paper, art paper, tracing paper, and overhead projector (OHP) transparencies.

As illustrated in FIG. 2, the sheet laminator 200 includes a sheet tray 102 serving as a sheet loader to stack lamination sheets S and/or inner sheets P, a pickup roller 105 to feed the lamination sheets S and/or the inner sheets P from the sheet tray 102, and a conveyance roller pair 107.

The sheet laminator 200 includes, for example, an entrance roller pair 108 serving as a first conveyor, a winding roller 109 serving as a rotating member, an exit roller pair 113 serving as a second conveyor. The entrance roller pair 108, the winding roller 109, and the exit roller pair 113 are disposed downstream of the conveyance roller pair 107 in a sheet conveyance direction. The sheet laminator 200 includes a conveyance path 125 and a relay conveyance path 126. The conveyance path 125 extends from the sheet tray 102 toward the entrance roller pair 108. The inner sheet P fed from the image forming apparatus 300 is conveyed through the relay conveyance path 126.

The downstream side from the exit roller pair 113 in the sheet conveyance direction is separated into the upper side and the lower side by a separation claw 118. The upper side includes heat pressing rollers 120 that are heat pressers to heat and press a lamination sheet S, and the lower side includes a conveyance roller pair 122. An ejection roller 121 and an ejection tray 104 are disposed downstream from the heat pressing rollers 120 and the conveyance roller pair 122.

The sheet laminator 200 further includes separation claws 116 between the winding roller 109 and the exit roller pair 113. The separation claws 116 are movable in the width direction of the lamination sheet S. Note that the entrance roller pair 108, the exit roller pair 113, the winding roller 109, and the separation claws 116 are some examples of a separation mechanism that separates the lamination sheet S. The pickup roller 105, the conveyance roller pair 107, the entrance roller pair 108, and the winding roller 109 are some examples of a first feeder.

A conveyance sensor C1 that detects the conveyance position of the lamination sheet S is disposed downstream from the conveyance roller pair 107 in the conveyance direction. A conveyance sensor C3 that detects the conveyance positions of the lamination sheet S and the inner sheet P is disposed downstream from the entrance roller pair 108 in the conveyance direction. An abnormal condition detection sensor C4 that detects the condition of the lamination sheet S is disposed downstream from the winding roller 109 in the conveyance direction. A conveyance sensor C5 that detects the conveyance position of the lamination sheet S is disposed downstream from the exit roller pair 113 in the conveyance direction. The relay conveyance path 126 is also provided with a conveyance sensor C2 that detects the conveyance position of the lamination sheet S and the inner sheet P.

The conveyance sensors C1 to C5 also serve as sheet detectors that detects whether the lamination sheet S and/or the inner sheet P is in the conveyance path. The conveyance sensors C1 to C5 are implemented by sensors such as optical sensors and ultrasonic sensors.

The sheet laminator 200 includes determination sensors 127 serving as a sheet determination device that determines the type of a conveyed sheet on the conveyance path 125. Details of the determination sensors 127 is described later.

An operation panel 10 (so-called operation panel) and a power ON/OFF button are disposed on an exterior of the sheet laminator 200. The operation panel 10 (so-called operation panel) is a notification device that displays information of a laminator main unit and inputs a processing instruction to the laminator main unit.

The operation panel 10 also serves as a notification device that issues a perception signal to the user. The operation panel 10 may notify such a signal with, e.g., a liquid crystal panel or a liquid emitting diode (LED). For example, a buzzer may be separately provided as the notification device to perform notification by sound.

Instead of the operation panel 10, for example, a switch or a button may be disposed to input a processing instruction.

Figure 3:
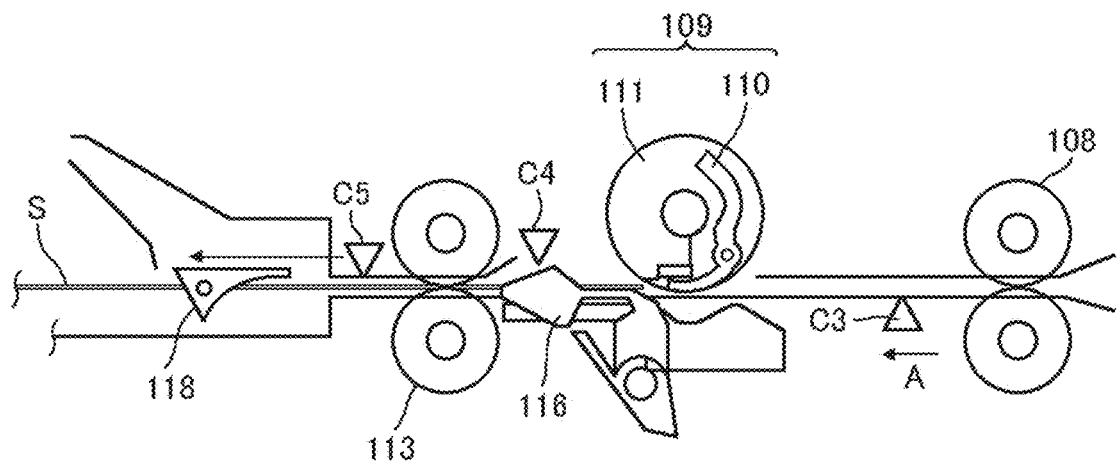
FIG. 3 is a schematic diagram illustrating a configuration of a main part of the sheet laminator illustrated in FIG. 2.

FIG. 3 is a configuration diagram illustrating a main part of the sheet laminator illustrated in FIG. 2. As illustrated in FIG. 3, each of the entrance roller pair 108 and the exit roller pair 113 is, for example, two rollers paired with each other and driven by a driving device (e.g., a motor). The entrance roller pair 108 rotates in one direction. The exit roller pair 113 rotates in forward and reverse directions, thereby nipping and conveying the lamination sheet S and the inner sheet P.

The entrance roller pair 108 conveys the lamination sheet S and the inner sheet P toward the exit roller pair 113. The sheet conveyance direction indicated by arrow A in FIG. 3 is hereinafter referred to as a "forward conveyance direction" or a sheet conveyance direction A.

The exit roller pair 113 is capable of switching the direction of rotation between the forward direction and the reverse direction. The exit roller pair 113 conveys the lamination sheet S nipped by the rollers of the exit roller pair 113 toward the ejection tray 104 (see FIG. 2) in the forward conveyance direction and also conveys the lamination sheet S toward the winding roller 109 in the direction opposite the forward conveyance direction (to convey the lamination sheet S in reverse). The sheet conveyance direction of the lamination sheet S toward the winding roller 109 (that is, the direction opposite the forward conveyance direction) indicated by arrow B in FIG. 3 is hereinafter referred to as a reverse conveyance direction or a sheet conveyance direction B.

The sheet laminator 200 is provided with the winding roller 109 as a rotator and the separation claws 116 that are disposed between the entrance roller pair 108 and the exit roller pair 113. The winding roller 109 is driven by a driver such as a motor to rotate in the forward and reverse directions. The direction of rotation of the winding roller 109 is switchable between the forward direction (clockwise direction) and the reverse direction (counterclockwise direction). A main controller 500 of the sheet laminator 200 causes the driver to control rotations of the winding roller 109 and operations of the separation claws 116.

The winding roller 109 includes a roller 111 and a sheet gripper 110 movably disposed on the roller 111 to grip the lamination sheet S. The sheet gripper 110 that is movable grips a trailing end of the lamination sheet S in the forward conveyance direction together with the roller 111. The sheet gripper 110 may be formed on the outer circumference of the roller 111 as a single unit or may be formed as a separate unit. The main controller 500 causes a driver to move the sheet gripper 110.

Next, the separating operation of the lamination sheet S of the sheet laminator 200 is described with reference to FIGS. 1 to 9. In FIGS. 3 to 9, elements identical to those illustrated in FIG. 1 or 2 are given identical reference numerals, and the descriptions thereof are omitted.

In FIG. 2, the lamination sheets S are stacked on the sheet tray 102 such that the bonded side is on the downstream side in the direction of feeding (conveyance direction) of the pickup roller 105. In the sheet laminator 200, the pickup roller 105 picks up the lamination sheet S from the sheet tray 102, and the conveyance roller pair 107 conveys the lamination sheet S toward the entrance roller pair 108.

Next, as illustrated in FIG. 3, the entrance roller pair 108 conveys the lamination sheet S toward the winding roller 109. In the sheet laminator 200, the entrance roller pair 108 conveys the lamination sheet S with the bonded end, which is one of four sides of the lamination sheet S, as the downstream side in the forward conveyance direction A as indicated by arrow A in FIG. 2.

The sheet laminator 200 temporarily stops conveyance of the lamination sheet S when the trailing end of the lamination sheet S in the forward conveyance direction has passed the winding roller 109. Note that these operations are performed by conveying the lamination sheet S from the lamination sheet sensor C3 by a specified amount in response to the timing at which the lamination sheet sensor C3 detected the leading end of the lamination sheet S.

Figure 4:
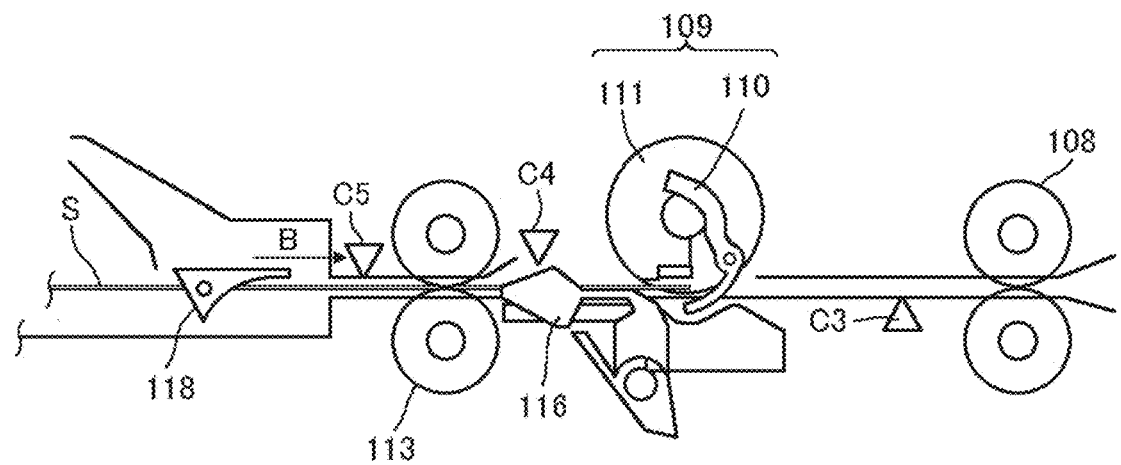
FIG. 4 is a schematic diagram illustrating the main part of the sheet laminator in a state subsequent to the state in FIG. 3.

Next, as illustrated in FIG. 4, the main controller 500 of the sheet laminator 200 causes the sheet gripper 110 to open and the exit roller pair 113 to rotate in the reverse direction to convey the lamination sheet S in the reverse conveyance direction (sheet conveyance direction B) toward the opened portion of the sheet gripper 110.

Figure 5:
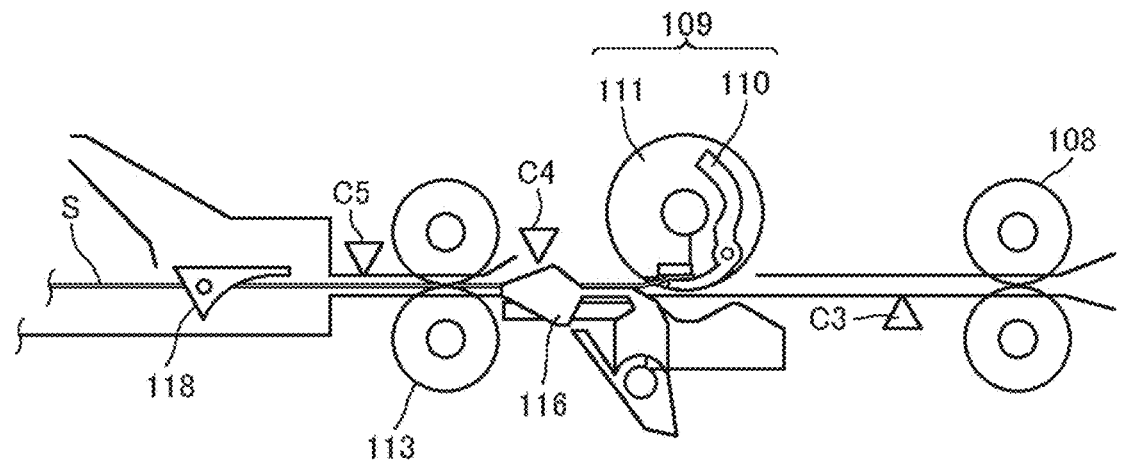
FIG. 5 is a schematic diagram illustrating the main part of the sheet laminator in a state subsequent to the state in FIG. 4.

Subsequently, as illustrated in FIG. 5, the main controller 500 of the sheet laminator 200 causes the exit roller pair 113 to stop rotating to stop conveyance of the lamination sheet S when the end of the lamination sheet S is inserted into the opened portion of the sheet gripper 110 and causes the driver to close the sheet gripper 110 to grip the end of the lamination sheet S. Note that these operations are performed when the lamination sheet S is conveyed by the specified amount.

Figure 6:
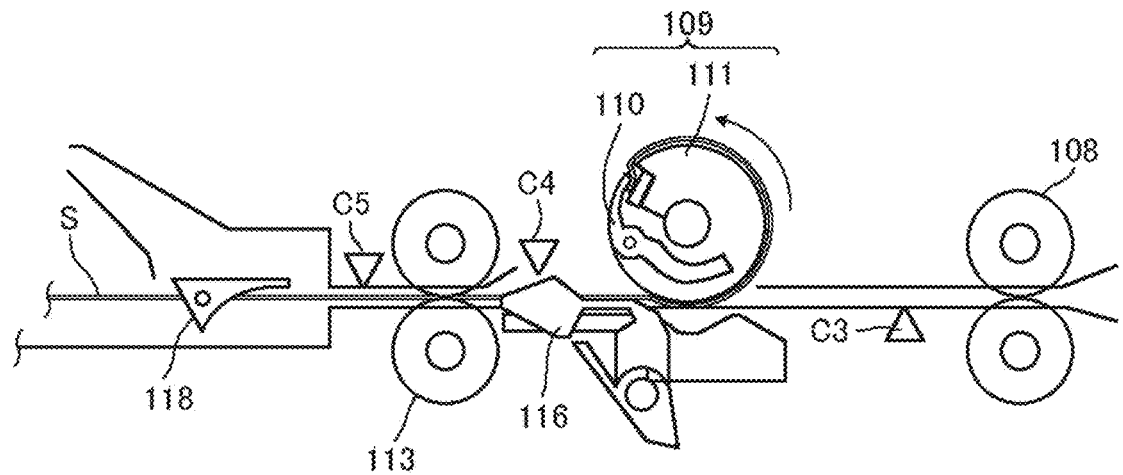
FIG. 6 is a schematic diagram illustrating the main part of the sheet laminator in a state subsequent to the state in FIG. 5.

Then, as illustrated in FIG. 6, the main controller 500 of the sheet laminator 200 causes the driver to rotate the winding roller 109 in the counterclockwise direction in FIG. 6 to wind the lamination sheet S around the winding roller 109. The lamination sheet S is wound around the winding roller 109 from the side where the two overlapping sheets of the lamination sheet S are not bonded.

Figure 7A:
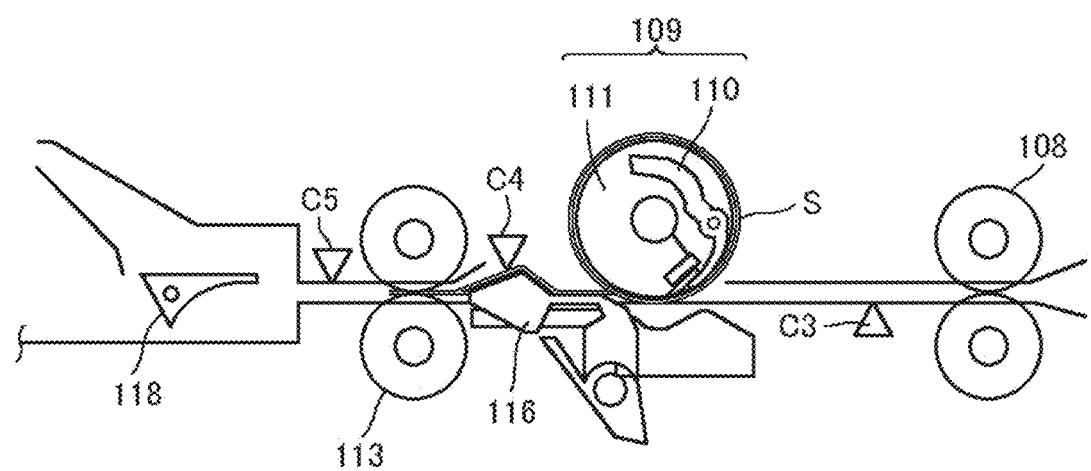
FIG. 7A is a schematic diagram illustrating the main part of the sheet laminator in a state subsequent to the state in FIG. 6.
Figure 7B:
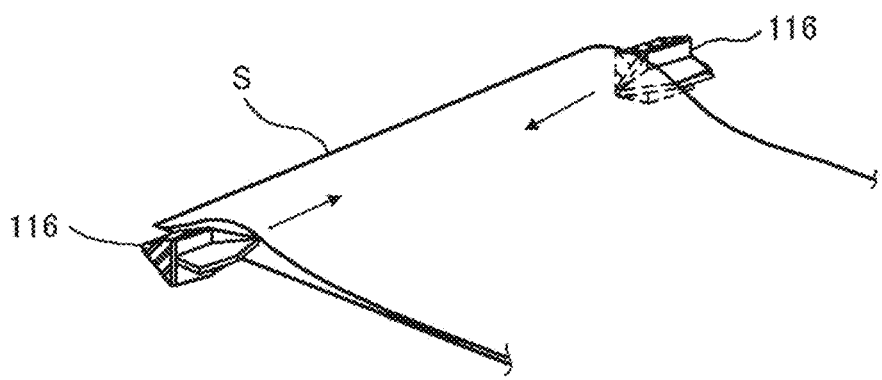
FIG. 7B is a perspective view of separation claws inserted into a space generated in a lamination sheet.

As illustrated in FIG. 7A, when the lamination sheet S that is the two-ply sheet is wound around the winding roller 109, a winding circumferential length difference is created between the two sheets in the amount of winding of the lamination sheet S around the circumference of the winding roller 109. There is a surplus of the sheet on the inner circumferential side to the center of the winding roller 109, which generates a slack toward the bonded end. As a result, a space is created between the two sheets constructing the two-ply sheet. As illustrated in FIG. 7B, as the separation claws 116 are inserted into the space generated as described above, from both sides of the lamination sheet S, the space between the two sheets is reliably maintained. Note that in response to detection of the leading end of the lamination sheet S with the conveyance sensor C5, the lamination sheet S is conveyed from the conveyance sensor C5 by a designated amount to perform these operations.

Figure 8A:
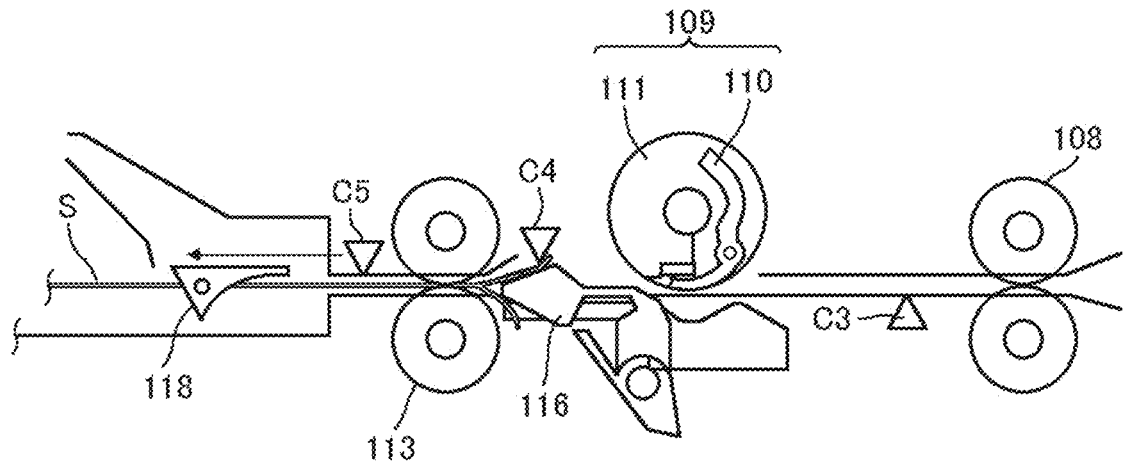
FIG. 8A is a schematic diagram illustrating the main part of the sheet laminator in a state subsequent to the state in FIG. 7A.
Figure 8B:
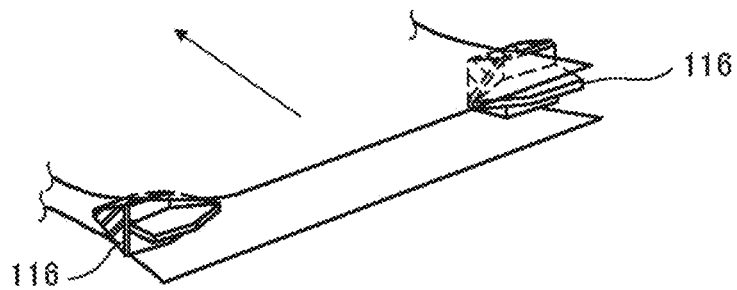
FIG. 8B is a perspective view of a lamination sheet whose trailing end is separated with separation claws.

In the sheet laminator 200, the winding roller 109 is rotated clockwise in a state where the separation claws 116 are inserted into the space formed in the lamination sheet S (see FIG. 7B). As illustrated in FIG. 8A, the main controller 500 causes the space generated in the lamination sheet S to shift to the trailing end of the lamination sheet S in the forward conveyance direction (sheet conveyance direction A). After the winding roller 109 has been rotated by a specified amount, the main controller 500 causes the driver to open the sheet gripper 110. As a result, the trailing end of the lamination sheet S is separated into the upper and lower sheets (see FIG. 8B).

In this state, the main controller 500 of the sheet laminator 200 causes the driver to temporarily stop the conveyance of the lamination sheet S and to further move the separation claws 116 in the width direction of the lamination sheet S to separate the whole area of the trailing end of the lamination sheet S. Note that in response to detection of the leading end of the lamination sheet S with the conveyance sensor C5, the lamination sheet S is conveyed from the conveyance sensor C5 by a designated amount to perform these operations.

Figure 9:
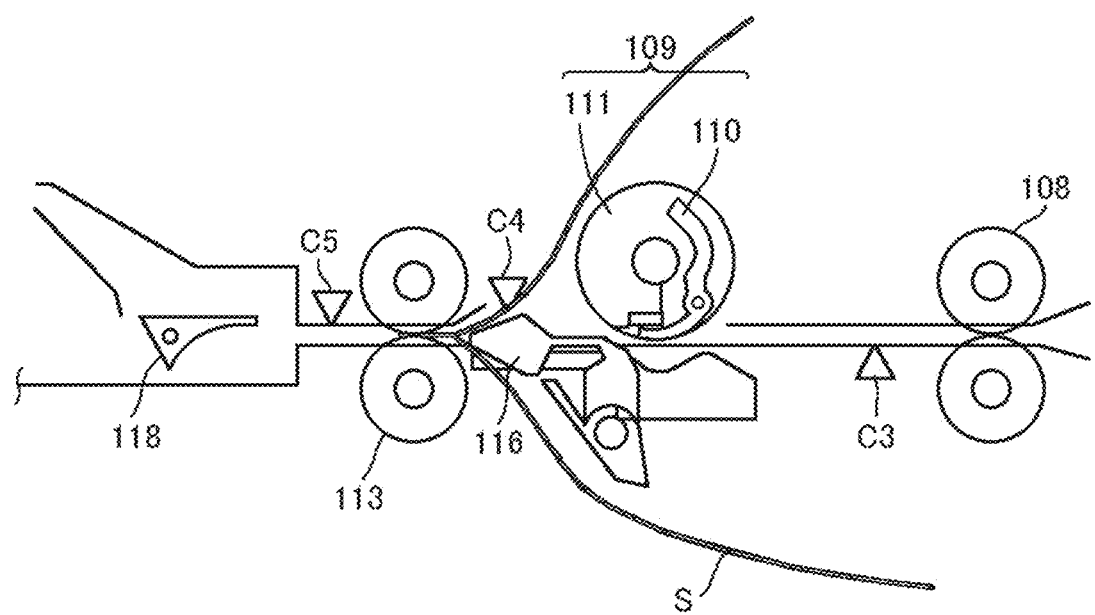
FIG. 9 is a schematic diagram illustrating the main part of the sheet laminator in a state subsequent to the state in FIG. 8A.

As illustrated in FIG. 9, after the separation claws 116 have separated the whole area of the trailing end of the lamination sheet S, the main controller 500 causes the driver to rotate the exit roller pair 113 in the counterclockwise direction in FIG. 9 to convey the lamination sheet S in the reverse conveyance direction (sheet conveyance direction B). Then, the separation claws 116 guide the two separated sheets of the lamination sheet S in the upper and lower directions, respectively, and the sheets are fully separated.

The main controller 500 of the sheet laminator 200 causes the driver to temporarily stop the conveyance of the lamination sheet S, so that the bonded portion of the lamination sheet S is held (nipped) by the exit roller pair 113. Accordingly, one end of the lamination sheet S is bonded as the bonded side of the lamination sheet S and the other end of the lamination sheet S is opened largely.

Note that in response to detection of the leading end of the lamination sheet S with the conveyance sensor C5, the lamination sheet S is conveyed from the conveyance sensor C5 by a designated amount to perform these operations. A series of operations starting from the conveyance of the lamination sheet S up to this point is referred to as "separation operation".

A description is given below of a configuration of a sheet laminator according to an embodiment of the present disclosure.

A first embodiment is described below.

A sheet laminator 200 according to the present embodiment is capable of loading at least one of a two-ply sheet (lamination sheet S) and a sheet medium (inner sheet P) on a sheet tray 102, and has a "mixing mode" in which the lamination sheet S or the inner sheet P is fed one by one. The mixing mode is a mode in which a two-ply sheet (e.g., a lamination sheet S) and a sheet medium (e.g., an inner sheet P) are fed from the sheet tray 102 of the sheet laminator 200, the sheet medium (inner sheet P) is sandwiched between separated sheets of the two-ply sheet (e.g., the lamination sheet S), and lamination is performed by the heat pressing rollers 120. The mixing mode corresponds to a third mode according to an embodiment o the present disclosure. Thus, an automatic off-line mode for performing lamination by the sheet laminator can be selected, thus enhancing the convenience of the user.

During this period, since it is not necessary to discharge the inner sheet P, the operation of the image forming apparatus 300 is stopped. Thus, the image forming apparatus does not operate as an image forming apparatus main in the off-line mode, thereby contributing to energy saving.

When the mixing mode is executed, not only the lamination sheet S but also the inner sheet P can be fed from the sheet tray 102. Accordingly, as the inner sheet P, not only a sheet (serving as a medium) printed by the image forming apparatus 300 but also a sheet (serving as a medium) loaded on the sheet tray 102 can be used.

When the mixing mode is executed, which of the lamination sheet S and the inner sheet P is fed from the sheet tray 102 is determined. Accordingly, as illustrated in FIG. 2, the sheet laminator 200 according to the present embodiment includes the determination sensors 127 that determine the type of the conveyed sheet on the conveyance path 125.

Figure 10A:
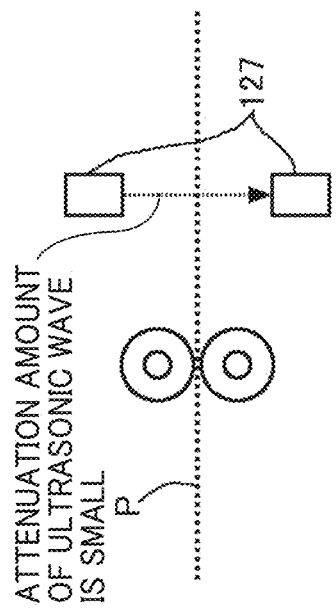
FIGS. 10A and 10B are schematic diagrams illustrating a configuration of determination sensors according to an embodiment of the present disclosure.
Figure 10B:
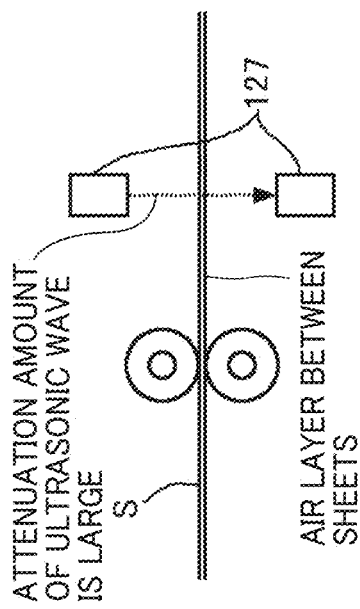

FIGS. 10A and 10B are schematic diagrams illustrating a configuration of determination sensors according to an embodiment of the present disclosure. The determination sensors 127 serving as a sheet determination device are a pair of ultrasonic sensors, one of which includes an ultrasonic wave transmitter and the other of which includes an ultrasonic wave receiver.

The type of a sheet (a two-ply sheet or a sheet medium) can be determined by the reduction amount of the ultrasonic wave when the sheet passes between the determination sensors 127. For example, (a) when a two-ply sheet (e.g., a lamination sheet S) passes, the reduction amount of the ultrasonic wave is relatively large since an air layer exists between separated sheets of the two-ply sheet. By contrast, (b) when the inner sheet P passes, the reduction amount of the ultrasonic wave is relatively small since the inner sheet P is one sheet. Accordingly, the type of the sheet conveyed from the sheet tray 102 can be determined using the determination sensors 127.

In the sheet laminator 200 according to the present embodiment, the main controller 500 changes the lamination processing (sheet processing) according to the determination result of the determination sensors 127.

Next, the sheet processing (lamination processing) in performing the mixing mode is described in detail.

Example 1

Figure 11:
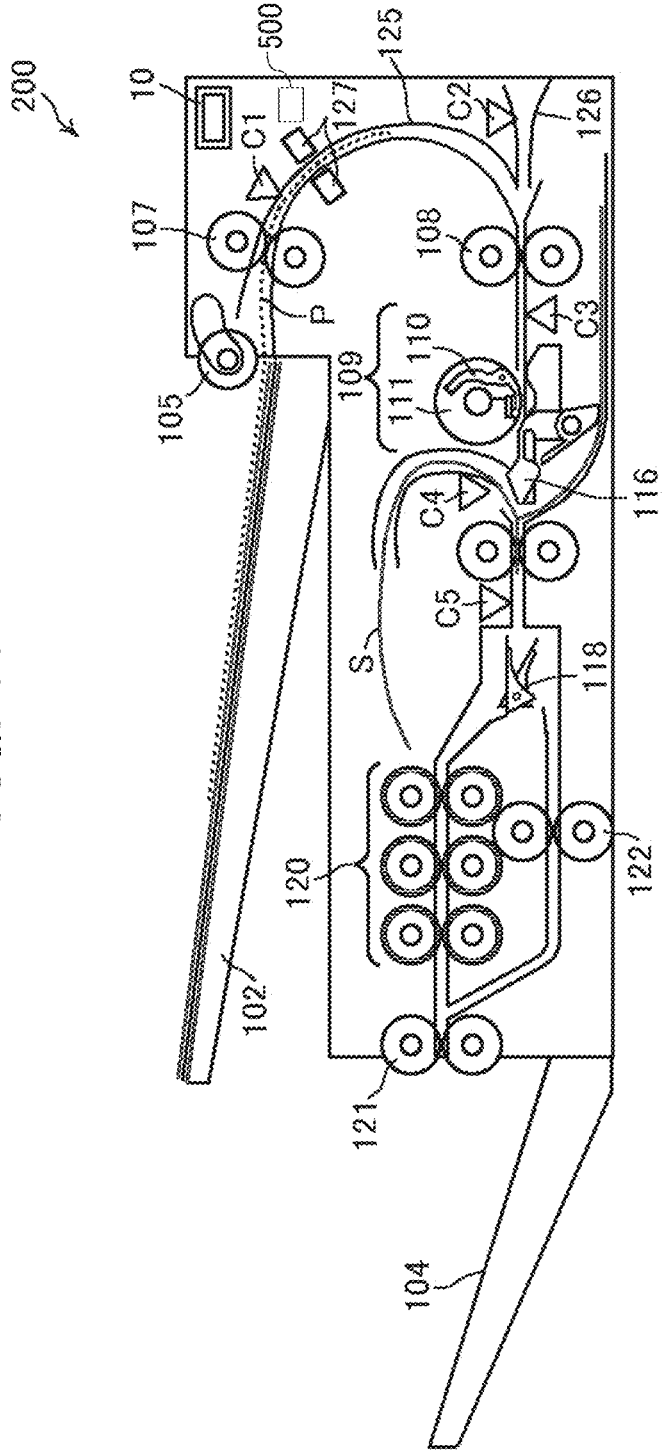
FIG. 11 is a schematic view of a sheet laminator that executes a mixing mode in a state in which a lamination sheet already separated is present in the sheet laminator.

FIG. 11 is a schematic view of the sheet laminator 200 that executes the mixing mode in a state in which a lamination sheet S already separated is present in the sheet laminator 200. Lamination sheets S and inner sheets P are loaded on the sheet tray 102, and the sheet detectors (conveyance sensors C1 to C5) detect a lamination sheet S already separated on the conveyance path of a laminator body.

Here, it is assumed that an inner sheet P is fed newly (as a first sheet) from the sheet tray 102 when the mixing mode is executed. In such a case, the sheet laminator 200 determines the sheet type as a sheet medium by the determination sensors 127 and inserts the inner sheet P into the already separated portions of the lamination sheet S.

Figure 12:
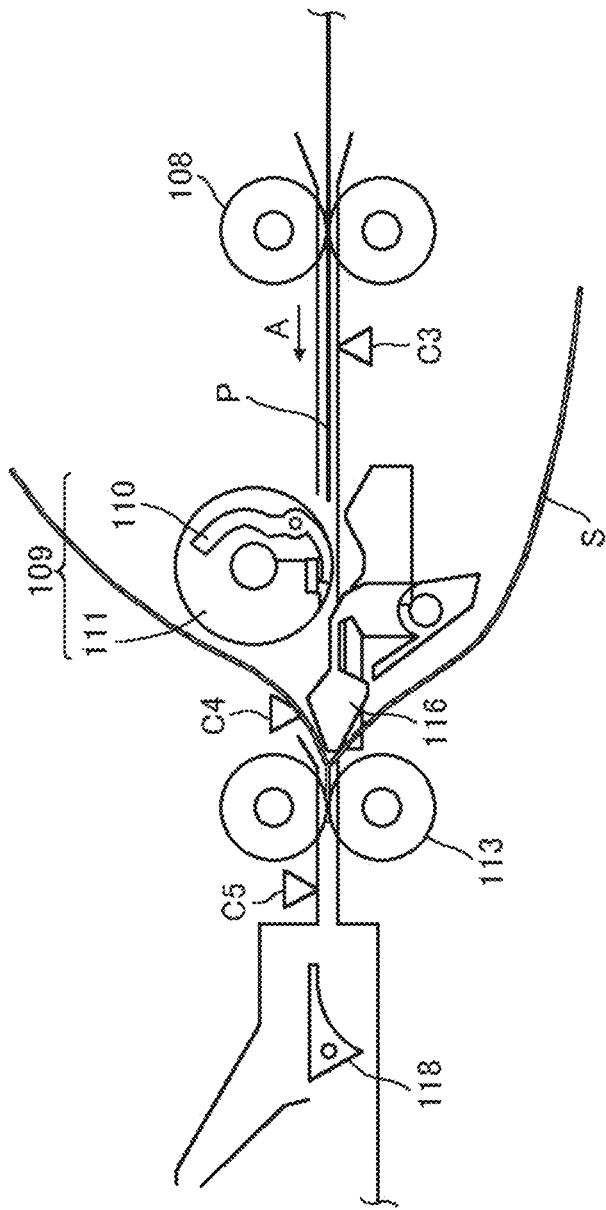
FIG. 12 is a schematic diagram illustrating the main part of the sheet laminator in a state subsequent to the state in FIG. 11.

For example, as illustrated in FIG. 12, the sheet laminator 200 rotates the entrance roller pair 108 to convey the inner sheet P conveyed from the sheet tray 102 (see FIG. 11) toward the exit roller pair 113 in the forward conveying direction (sheet conveyance direction A).

Figure 13:
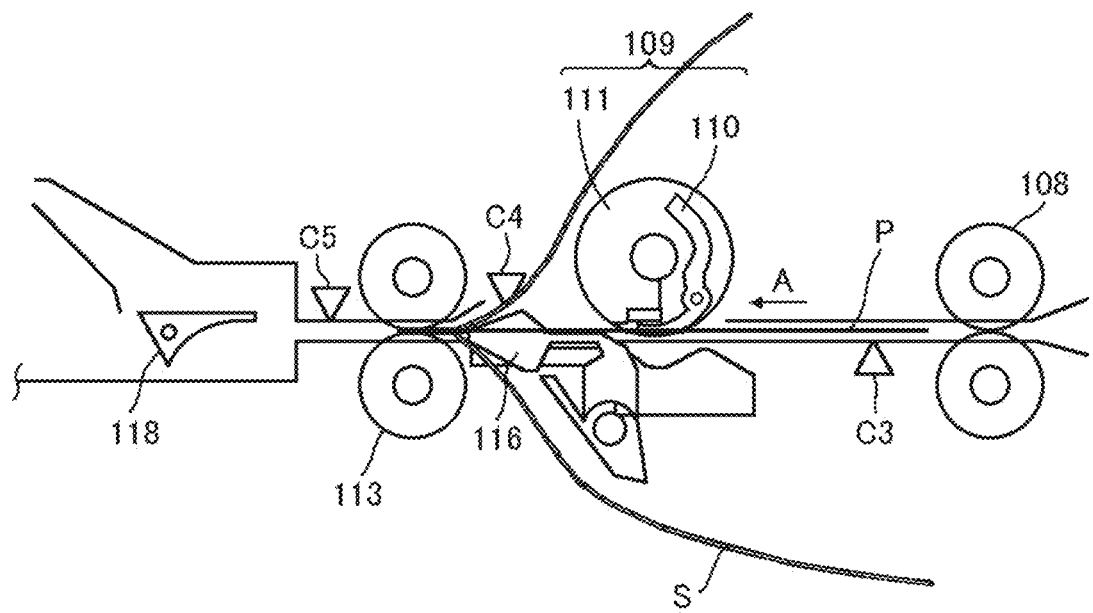
FIG. 13 is a schematic diagram illustrating the main part of the sheet laminator in a state subsequent to the state in FIG. 12.
Figure 14:
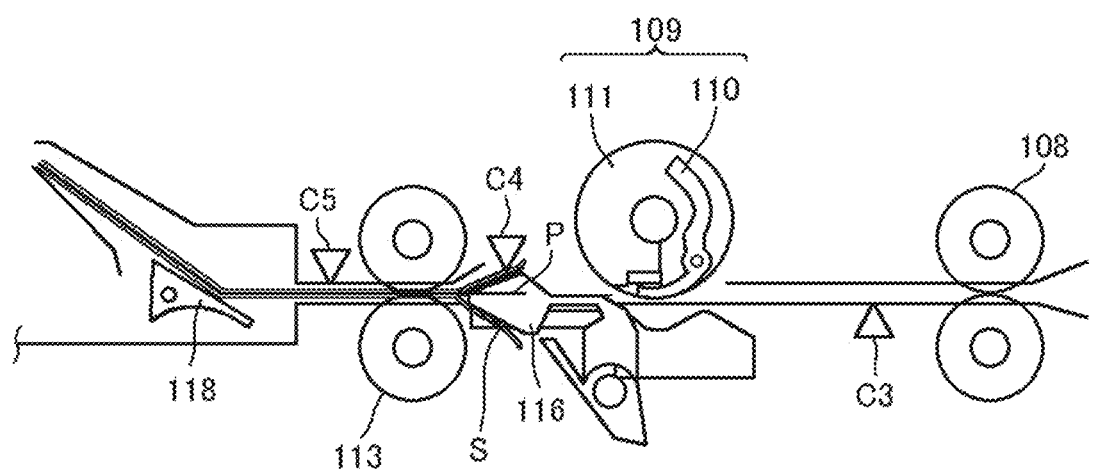
FIG. 14 is a schematic diagram illustrating the main part of the sheet laminator in a state subsequent to the state in FIG. 13.

Subsequently, as illustrated in FIGS. 13 and 14, the main controller 500 of the sheet laminator 200 causes the exit roller pair 113 to rotate so that the lamination sheet S and the inner sheet P meet to insert the inner sheet P into the lamination sheet S from the open portion (on the other end) of the lamination sheet S. This series of operations starting from the conveyance of the inner sheet P is referred to as an "inserting operation".

The lamination sheet S sandwiching the inner sheet P is subsequently subjected to lamination processing (or is not subjected to lamination processing), and is then ejected to the ejection tray 104.

Example 2

Figure 15:
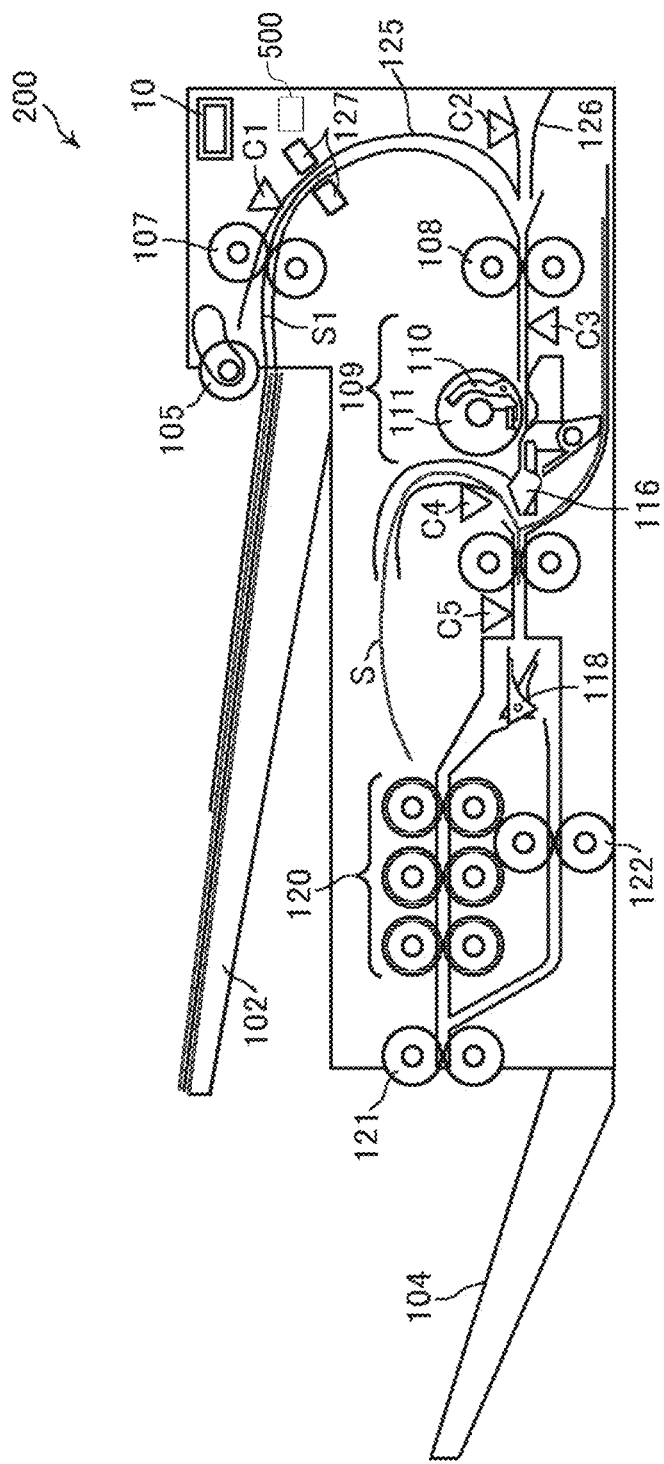
FIG. 15 is a schematic view of the sheet laminator that executes a mixing mode in a state in which a lamination sheet already separated is present in the sheet laminator.

FIG. 15 is also a schematic view of the sheet laminator 200 during execution of the mixing mode in a state in which a lamination sheet S already separated is present in the laminator body. As in FIG. 11, lamination sheets S and inner sheets P are loaded on the sheet tray 102, and a lamination sheet S that has already been separated is present on the conveyance path in the laminator body.

Here, it is assumed that a lamination sheet S1 (two-ply sheet) is fed newly (as a first sheet) from the sheet tray 102 when the mixing mode is executed. In such a case, when the sheet type is determined to be a two-ply sheet by the determination sensors 127, the sheet laminator 200 ejects the lamination sheet S in the laminator body and newly separates the lamination sheet S1.

Such a configuration can prevent a plurality of two-ply sheets from being mixed in the sheet laminator 200 and obviate the need for the user to remove the lamination sheet S in the sheet laminator 200, thus preventing occurrence of a downtime.

Alternatively, the pickup roller 105 and the conveyance roller pair 107 may be configured to be rotatable in the forward and reverse directions, and the lamination sheet S1 may be conveyed in the reverse direction and returned to the sheet tray 102. In such a case, the user only needs to remove the lamination sheet S1 from the sheet tray 102, and the operation time can be shortened.

As another alternative, when the sheet type is determined to be a two-ply sheet in execution of the mixed mode, feeding of a new lamination sheet S1 may be stopped to terminate the mixed mode, and an inner sheet P conveyed from the image forming apparatus 300 may be inserted into the lamination sheet S in the sheet laminator 200.

Example 3

Figure 16:
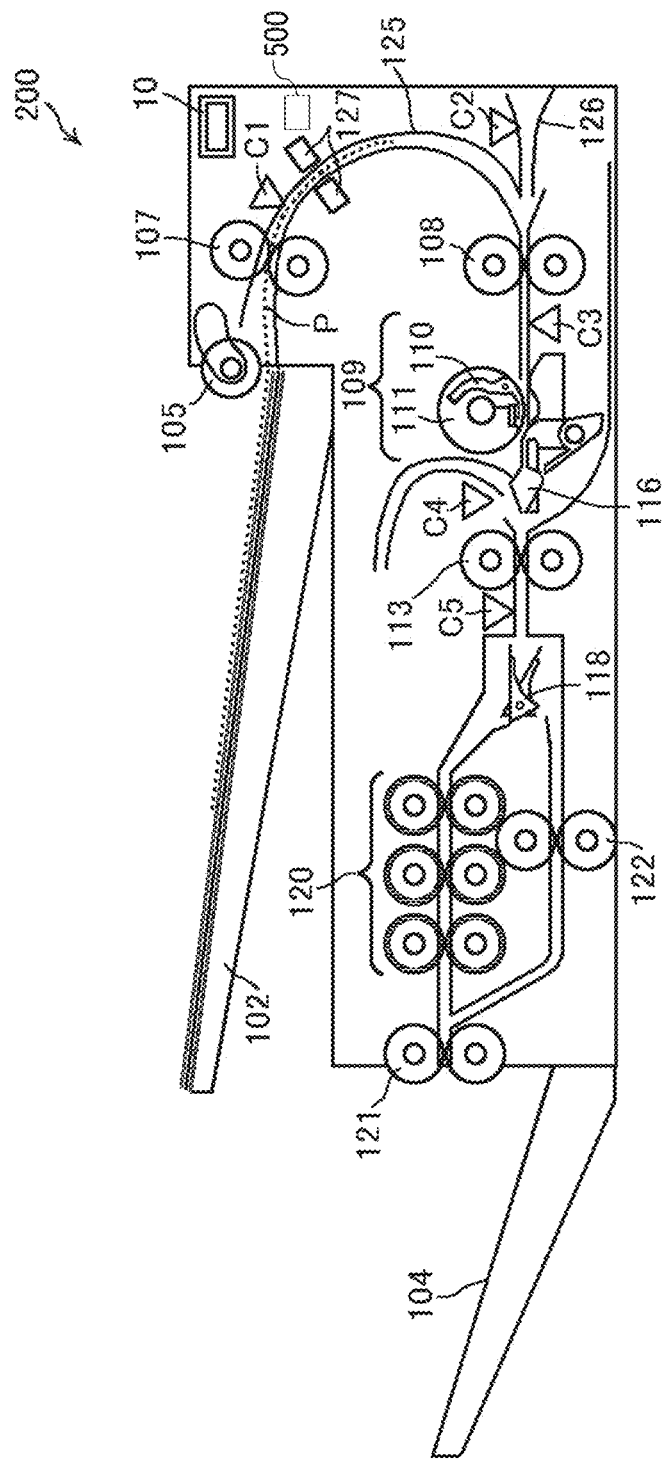
FIG. 16 is a schematic view of the sheet laminator that executes the mixing mode in a state in which a lamination sheet already separated is absent in the sheet laminator.

FIG. 16 is a schematic view of the sheet laminator 200 that executes the mixing mode in a state in which a lamination sheet S already separated is absent in the sheet laminator 200. FIG. 16 is different from FIGS. 11 and 15 in that the sheet detectors (conveyance sensors C1 to C5) do not detect already-separated portions of the lamination sheet S on the conveyance path of the laminator body (in other words, there is no separated sheet).

Figure 17:
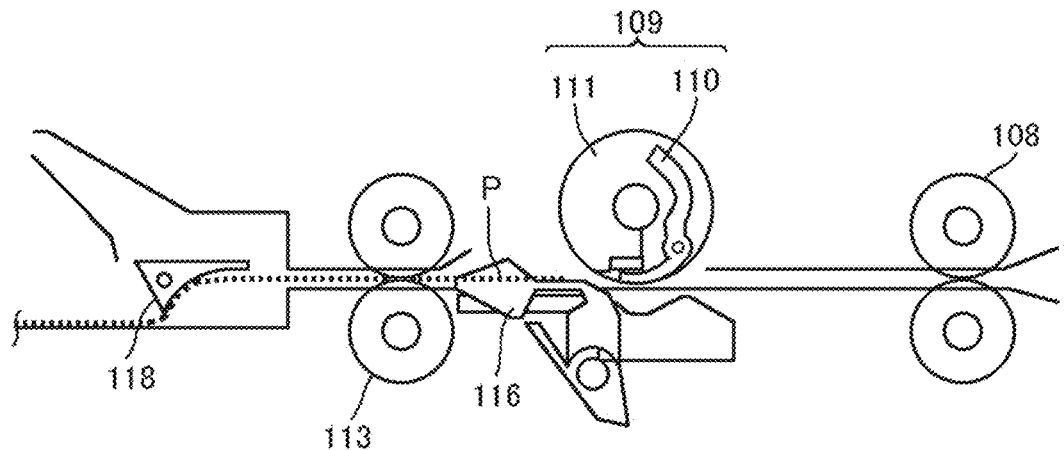
FIG. 17 is a schematic diagram illustrating the main part of the sheet laminator in a state subsequent to the state in FIG. 16.

Here, it is assumed that an inner sheet P is fed newly (as a first sheet) from the sheet tray 102 when the mixing mode is executed. In such a case, when the sheet type is an inner sheet (sheet medium) by the determination sensors 127, the sheet laminator 200 ejects the inner sheet P as it is (see FIG. 17).

Accordingly, even if an inner sheet P is fed by mistake before the lamination sheet S (two-ply sheet) is separated, the processing is not interrupted, thus preventing occurrence of downtime.

Figure 18:
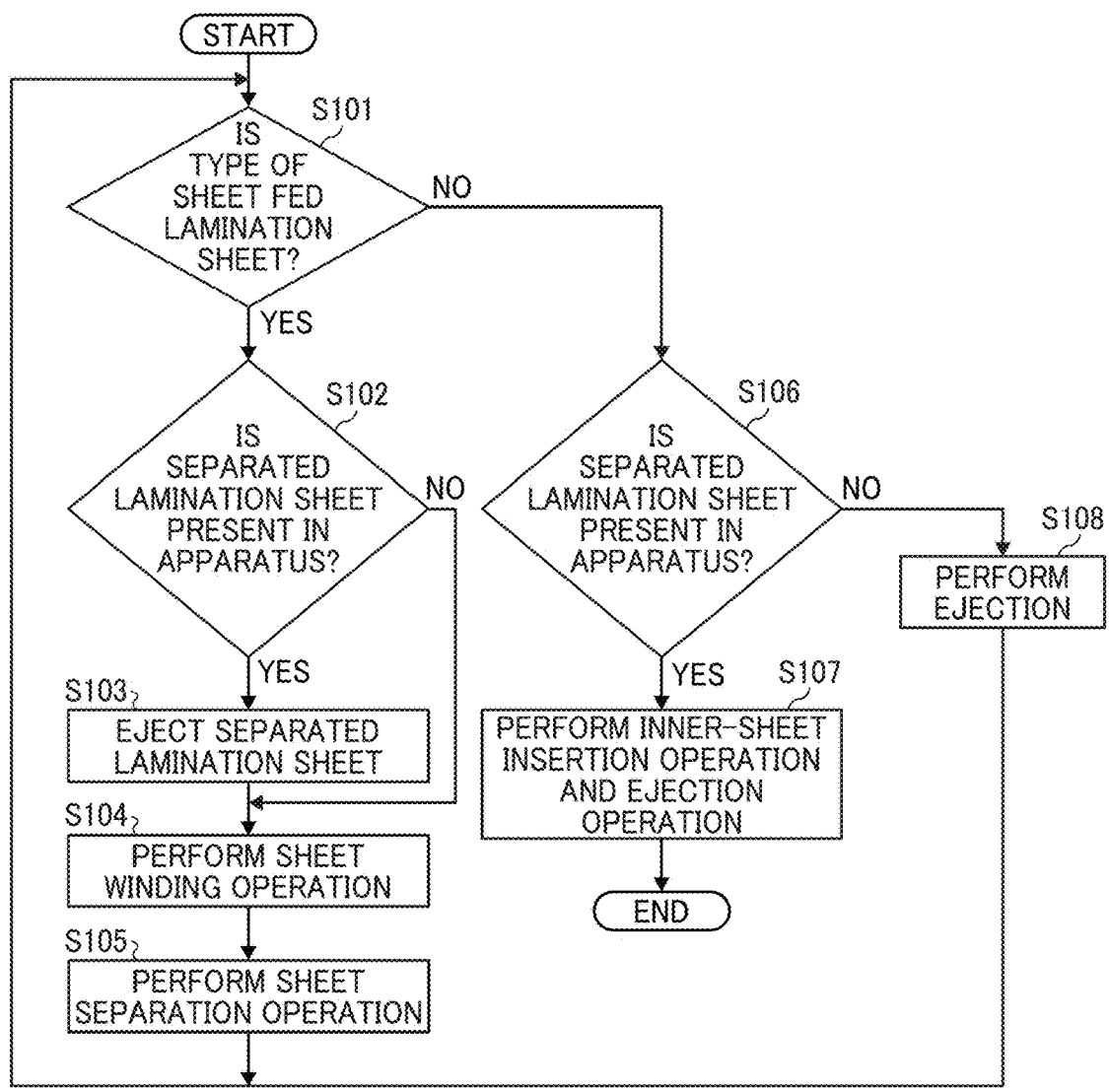
FIG. 18 is a flowchart illustrating a series of steps of lamination processing in the mixing mode.

FIG. 18 is a flowchart illustrating a series of steps of lamination processing in the mixing mode. A description is given below of the series of steps with reference to FIG. 22.

In step S101, the main controller 500 of the sheet laminator 200 determines the type of a sheet fed from the sheet tray 102 with the determination sensors 127. If the sheet type is a lamination sheet (two-ply sheet S1) (YES in step S101), the process proceeds to step S102.

In step S102, the main controller 500 of the sheet laminator 200 determines, with the conveyance sensors C1 to C5, whether a lamination sheet S that has already been separated is present on the conveyance path of the laminator body. When the lamination sheet S is present (YES in step S102), in step S103, the sheet laminator 200 ejects the separated sheet (Example 2; see FIG. 15). Then, the process proceeds to step S104.

When there is no lamination sheet S on the conveyance path of the laminator body in step S102 (NO in step S102), the process also proceeds to step S104.

In step S104, the sheet laminator 200 winds the fed lamination sheet S1 around the winding roller 109 (see FIGS. 5 and 6). In step S105, the sheet laminator 200 separates the entire two sheets of the lamination sheet S1 from each other (see FIG. 9).

After the completion of step S105, the sheet laminator 200 is in a state in which the already-separated sheet S1 is present in the laminator body. Then, the process returns to step S101 again.

In step S101, when the sheet type is a sheet medium (inner sheet P) (NO in step S101), the process proceeds to step S106.

In step S106, the main controller 500 of the sheet laminator 200 determines, with the conveyance sensors C1 to C5, whether a lamination sheet S that has already been separated is present on the conveyance path of the laminator body. When the lamination sheet S (or the lamination sheet S1) is present (YES in step S102), in step S107, the main controller 500 of the sheet laminator 200 performs the inserting operation and the ejecting operation of the inner sheet P (Example 1; see FIGS. 12 to 14).

Thus, a series of steps of sheet processing (lamination processing) is completed.

When the main controller 500 of the sheet laminator 200 determines in step S106 that no lamination sheet S (or a lamination sheet S2) is present on the conveyance path of the laminator body (NO in step S106), the process proceeds to step S108. The sheet laminator 200 ejects the inner sheet P as it is (Example 3; see FIG. 17).

After completion of step S108, the sheet laminator 200 is in a state in which there is no lamination sheet S1 that has already been separated in the laminator body. Then, the process returns to step S101 again to wait for feeding again.

As described above, in the sheet laminator 200 according to the present embodiment, the main controller 500 changes the lamination processing (sheet processing) according to the determination result of the sheet determination device and the detection result of the sheet detector when the mixing mode is executed. Accordingly, both types of sheets, in other words, lamination sheets S and inner sheets P can be mixed on the sheet tray 102, and the number of types of insertable inner sheets can be increased. In addition, the need for increasing the size of the sheet laminator can be obviated.

A description is given below of an advantageous configuration of the sheet laminator 200.

When the sheet laminator 200 determines that a first conveyed sheet and a second conveyed sheet are of the same sheet type in the mixed mode, it is desirable to change the lamination processing (sheet processing).

For example, when both the first sheet and the second sheet are two-ply sheets (S1 and S2), the main controller 500 stops the conveyance of both two-ply sheets (S1 and S2) as error processing. Such a configuration can prevent the two-ply sheets from being jammed in the sheet laminator 200.

When both the first sheet and the second sheet are two-ply sheets (S1 and S2), the first sheet S1 is separated while the second sheet S2 is reversely conveyed and returned to the sheet tray 102. Such a configuration can prevent the two-ply sheets from being jammed and facilitate the subsequent processing.

A second embodiment is described below.

A sheet laminator according to a second embodiment has a feature in which an operation panel 10 serving as a notification device indicates the type of sheets loaded on a sheet tray 102 to the user and guides the user to perform a correct operation.

Figure 19:
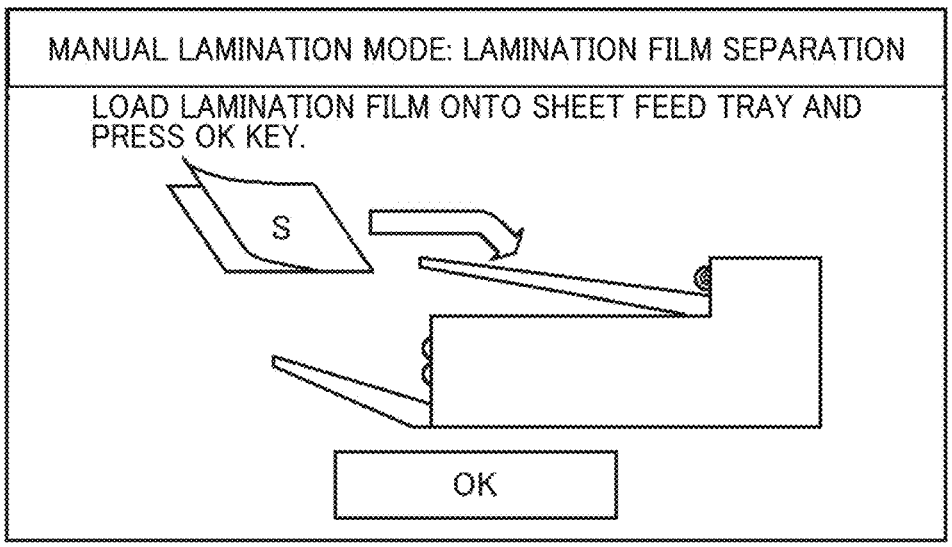
FIG. 19 is an illustration of an example of a screen displayed on an operation panel to prompt loading of a lamination film on a sheet tray.
Figure 20:
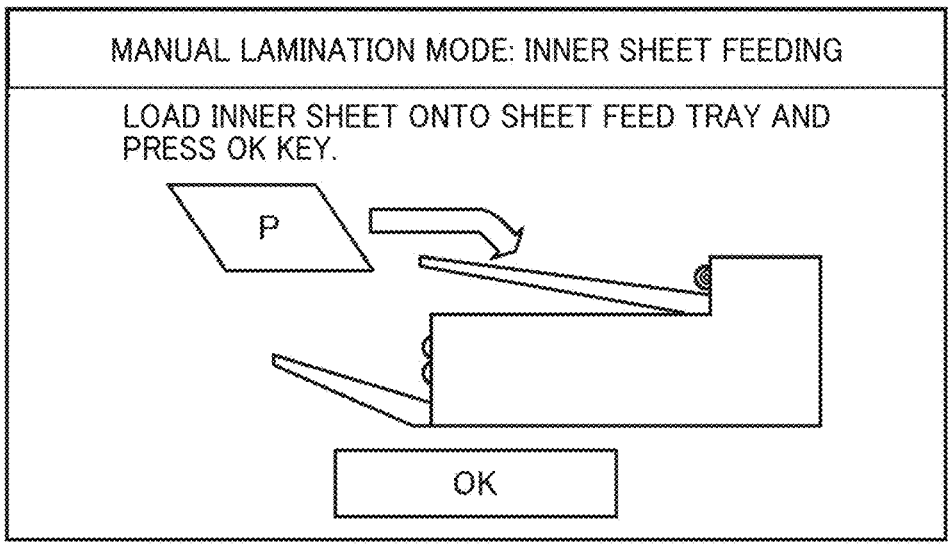
FIG. 20 is an illustration of an example of a screen displayed on an operation panel to prompt loading of an inner sheet on a sheet tray.

FIG. 19 is an example of a screen displayed on the operation panel to prompt loading of a lamination film on the sheet tray. FIG. 20 is an example of a screen displayed on the operation panel to prompt loading of an inner sheet on the sheet tray.

In the mixing mode, a screen as illustrated in FIG. 19 or FIG. 20 is displayed on the operation panel 10 to prompt the user to load a lamination film (two-ply sheet) or an inner sheet (sheet medium). This mode is referred to as a manual lamination mode in that the mode prompts the user to perform work.

When the user loads sheets as instructed on the screen on the sheet tray 102 and touches (presses) an area displayed as "OK", the sheet laminator 200 starts a series of steps of lamination processing.

Figure 21:
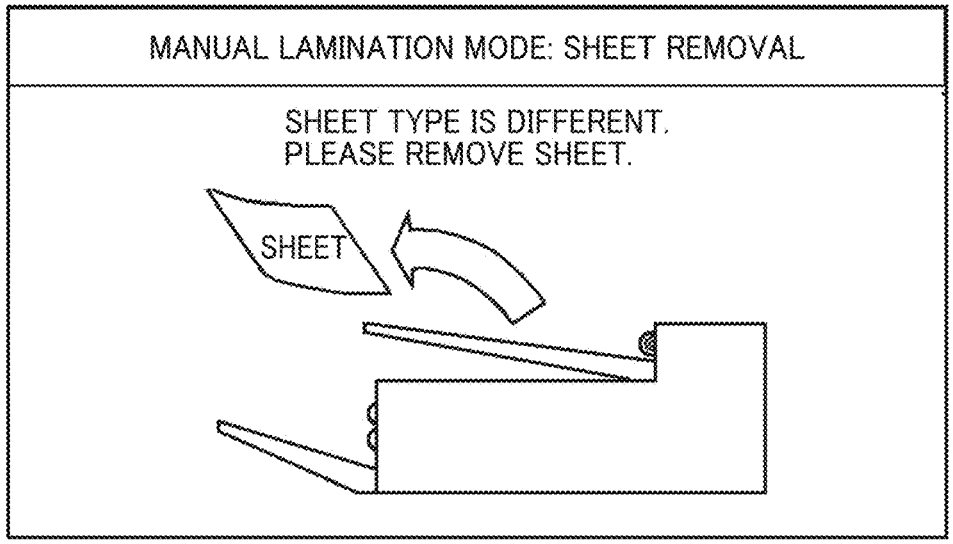
FIG. 21 is an example of an error screen displayed on an operation panel.

However, when the user touches (or presses) an area displayed as "OK" without loading the sheet as instructed on the screen onto the sheet tray 102, an error screen as illustrated in FIG. 21 is displayed on the operation panel 10 to prompt the user to confirm.

The type of the loaded sheets is determined by the determination sensors 127 (see FIGS. 2 and 10) serving as the sheet determination device described above. A dedicated sensor may be separately provided.

Figure 22:
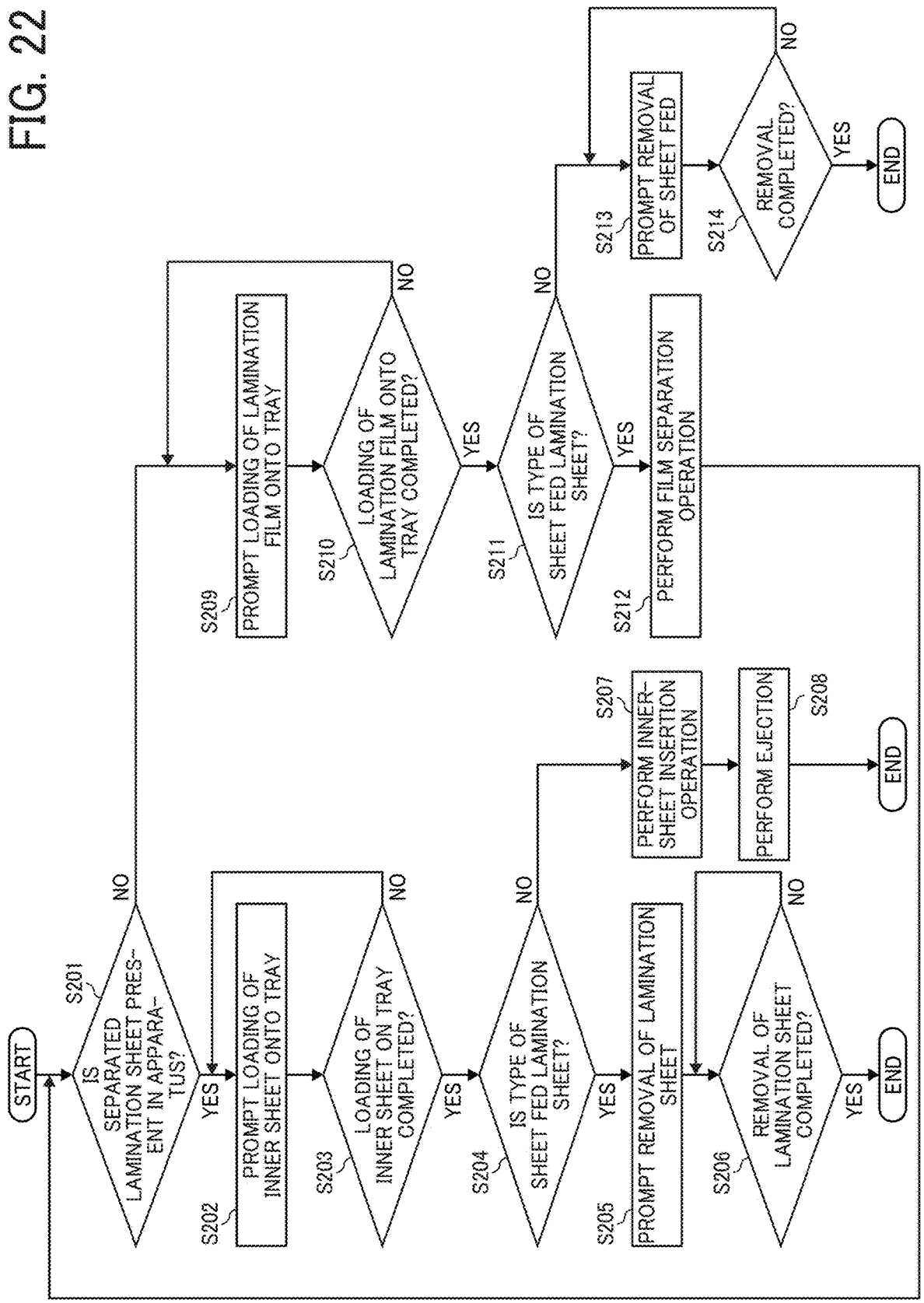
FIG. 22 is a flowchart illustrating a series of steps of lamination processing in a mixing mode.

FIG. 22 is a flowchart illustrating a series of steps of lamination processing in the mixing mode as the third mode and the manual lamination mode. A description is given below of the series of steps with reference to FIG. 22.

In step S201, the main controller 500 of the sheet laminator 200 determines whether a lamination sheet S that has already been separated is present on the conveyance path of the laminator body. When the lamination sheet S is present (YES in step S201), in step S202, the main controller 500 of the sheet laminator 200 displays, on the operation panel 10, a screen for prompting loading of inner sheets on the sheet tray 102 (see FIG. 19). In step S203, the main controller 500 waits for the user to load an inner sheet P on the sheet tray 102 and instruct the start of the lamination processing.

In step S204, the main controller 500 of the sheet laminator 200 determines whether the sheet type is a lamination sheet (two-ply sheet S). When the sheet is a lamination sheet (YES in step S204), the process proceeds to step S205. The main controller 500 of the sheet laminator 200 displays an error screen for prompting sheet removal on the operation panel 10 (see FIG. 21). In step S206, the user removes the lamination sheet.

On the other hand, in step S204, when the sheet type is an inner sheet (NO in step S204), the process proceeds to step S207. The sheet laminator 200 performs the inserting operation of the inner sheet. After the operation is completed, the process proceeds to step S208, and the sheet is ejected.

In the previous step S201, if there is no sheet S that has already been separated on the conveyance path of the laminator body, in step S209, the main controller 500 of the sheet laminator 200 displays on the operation panel 10 a screen for prompting loading of a lamination sheet on the sheet tray 102 (see FIG. 20). In step S210, the main controller 500 waits for the user to load a lamination sheet S on the sheet tray 102 and instruct the start of the lamination processing.

In step S211, the main controller 500 of the sheet laminator 200 determines whether the sheet type is a lamination sheet (two-ply sheet S). When the sheet is a lamination sheet (YES in step S211), the process proceeds to step S212. The sheet laminator 200 performs separating operation. Then, the process returns to step S201.

By contrast, in step S211, when the sheet type is an inner sheet (NO in step S211), the process proceeds to step S213. The main controller 500 of the sheet laminator 200 displays an error screen for prompting sheet removal on the operation panel 10 (refer to FIG. 21). In step S214, the main controller 500 waits for the user to remove the lamination sheet.

As described above, in the sheet laminator 200 according to the present embodiment, the user can load a lamination sheet or an inner sheet as the manual lamination mode when the mixing mode is executed. In such a case, since a message is displayed on the operation panel 10, the user can be guided to the correct operation.

A third embodiment is described below.

Figure 23:
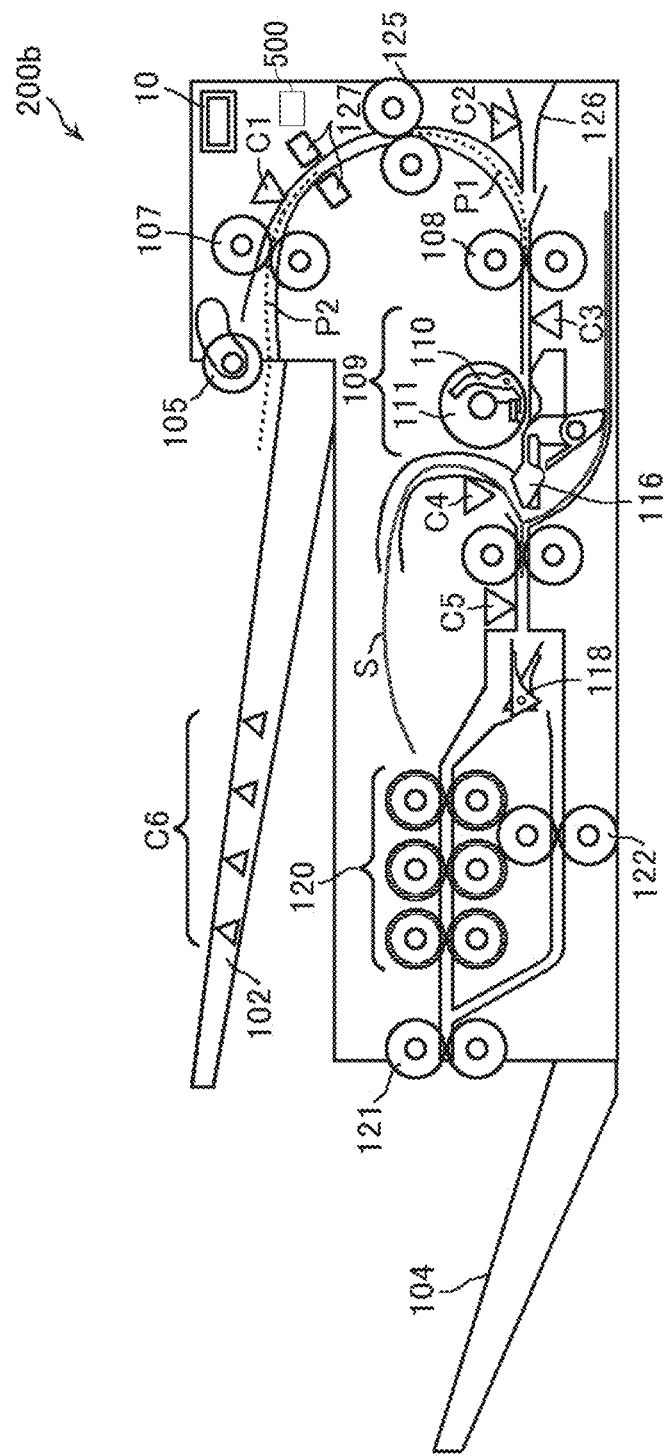
FIG. 23 is a schematic view illustrating an overall configuration of a sheet laminator according to a third embodiment of the present disclosure.

FIG. 23 is a schematic view illustrating an overall configuration of a sheet laminator according to an embodiment of the present disclosure. In a sheet laminator 200b according to the present embodiment, the sheet tray 102 is provided with a size sensor C6 that is a size detector to detect the size of the sheet being conveyed (or the length of the conveyed sheet in the conveyance direction).

In other words, the sheet laminator 200b can detect the conveyance direction length Ls of a lamination sheet S and the conveyance direction length Lp of an inner sheet P using the size sensor C6.

In the sheet laminator 200b according to the present embodiment, a size comparator of a main controller 500 that controls the entire operation of the sheet laminator 200b can compare the conveyance direction length Ls of the lamination sheet S and the conveyance direction length Lp of the inner sheet P. The main controller 500 is configured by a computer including, for example, a central processing unit (CPU), a read-only memory (ROM), a random access memory (RAM), and an input/output (I/O). The size comparator is software implemented in the computer.

In the mixed mode, when the separated lamination sheet S is present on the conveyance path of the laminator body and the detected conveyance direction length Lp of the inner sheet P falls within the conveyance direction length Ls of the lamination sheet S (Ls>Lp), the sheet laminator 200b performs the inserting operation of the inner sheet P. However, in a case where the inner sheet P does not fall within the lamination sheet S (Ls>Lp), the main controller 500 stops the conveyance of the inner sheet P at that time and performs error processing.

Figure 24:
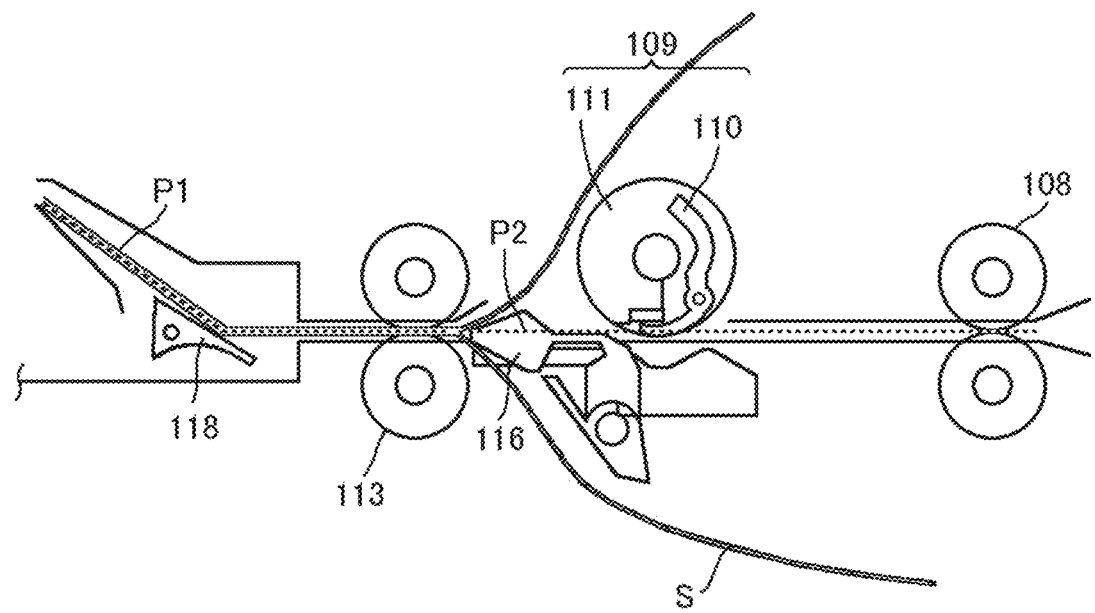
FIG. 24 is a schematic diagram illustrating the main part of the sheet laminator.

As illustrated in FIG. 24, when a plurality of inner sheets are fed and the sum (P1+P2) of the conveyance direction lengths of inner sheets Lp1 and Lp2 falls within the conveyance direction length Ls of the lamination sheet S (Ls>Lp1+Lp2), the sheet laminator 200 inserts the inner sheets P1 and P2. By contrast, if the inner sheets P1 and P2 do not fall within the lamination sheet S (Ls>Lp1+Lp2), the main controller 500 stops the conveyance of the inner sheets P1 and P2 at that time and performs error processing.

In a case where only the inner sheet P1 has a size that falls within the lamination sheet S (Ls>Lp1), only the inner sheet P1 may be inserted into the lamination sheet S, and the main controller 500 may stop the conveyance of the inner sheet P2 and perform error processing.

An inner sheet(s) (inner sheet P2 or both inner sheets P1 and P2) may be reversely conveyed and returned to the sheet tray 102. In such a case, the user only needs to acquire an inner sheet(s) (inner sheet P2 or both inner sheets P1 and P2) from the sheet tray 102, thus facilitating subsequent processing.

As described above, the sheet laminator 200b according to the present embodiment detects the conveyance direction length of a conveyed sheet by the size sensor C6, and changes the lamination processing (sheet processing) according to the comparison result of the size comparator. Accordingly, a plurality of inner sheets P can be appropriately inserted into the lamination sheet S.

As the size detector, the conveyance sensor C1 can be used to detect the size of the sheet at the detection timing. Alternatively, an encoder of a motor that rotates the conveyance roller pair 107 may be used. Further, the size sensor C6, the conveyance sensor C1, and the encoder may be used in combination.

Next, the first mode according to an embodiment of the present disclosure is described with reference to FIGS. 1 and 12 to 14.

The first mode is a mode in which, in the image forming system 400, a sheet medium (e.g., an inner sheet P) on which an image has been formed by the image forming apparatus 300 is sandwiched between separated sheets of a two-ply sheet (e.g., an lamination sheet S) by the sheet processing apparatus or the sheet laminator 200, and lamination processing is performed by a heat presser (e.g., the heat pressing rollers 120)

An inner sheet P is stored in at least one of the plurality of feeding units 5 of the image forming apparatus 300 in FIG. 1.

When the first mode is executed, first, the inner sheet P is fed, printing is performed by the image forming unit 4 of the image forming apparatus 300, and an image is fixed by the heat fixing unit 3. Thereafter, the inner sheet P passes through the conveyance path in the image forming apparatus 300 and is conveyed to the relay conveyance path 126 of the sheet laminator 200. Thereafter, as illustrated in FIG. 12, the inner sheet P is conveyed toward the inside of the lamination sheet S separated, and as illustrated in FIGS. 13 and 14, the inner sheet P is merged with the lamination sheet S and sandwiched between the separated sheets of the lamination sheet S.

The lamination sheet S sandwiching the inner sheet P is laminated by heating and pressing of the heat pressing rollers 120 and is then ejected to the ejection tray 104.

Here, an operation device for the user to select the first mode, the second mode, and the third mode is described with reference to FIGS. 25 to 27.

Figure 25:
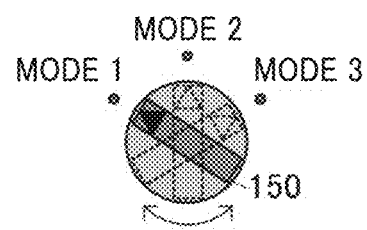
FIG. 25 is a diagram illustrating an example of an operation device to allow a user to select a first mode, a second mode, or a third mode.

As illustrated in FIG. 25, the sheet laminator 200 or the image forming apparatus 300 includes a rotary switch 150. The user rotates the rotary switch 150 to select the first mode, the second mode, or the third mode. Instead of the rotary switch 150, three buttons corresponding to the respective modes may be provided. The switch or buttons allow the user to easily switch the mode among the first mode, the second mode, and the third mode.

Figure 26:
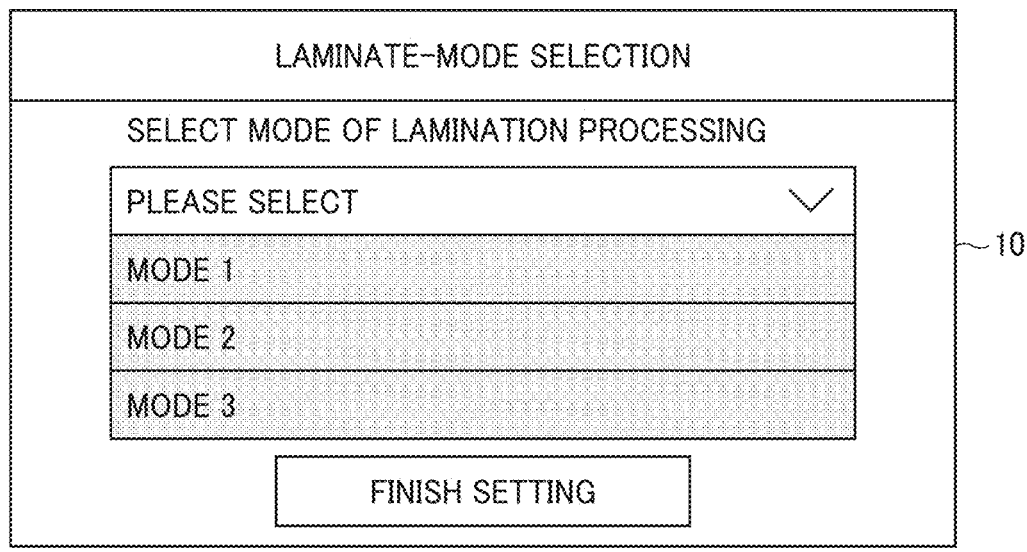
FIG. 26 is a diagram illustrating an example of the operation device to allow a user to select a first mode, a second mode, or a third mode.

As illustrated in FIG. 26, instead of or in addition to the rotary switch 150, the operation panel 10 is installed in the sheet laminator 200 or the image forming apparatus 300. The user touches the operation panel 10 to select the first mode, the second mode, or the third mode. Switching on the operation panel 10 allows the user to easily switch the mode among the first mode, the second mode, and the third mode. The main controller 500 of the sheet laminator 200 controls, for example, the heat pressing rollers 120 and the image forming apparatus 300 to perform the first mode, the second mode, or the third mode in accordance with the selection on the operation panel 10. The controller that performs the control of the first mode, the second mode, and the third mode is not limited to the main controller 500 of the sheet laminator 200 and may be any other controller of the image forming system 400. For example, a controller of the image forming apparatus 300 may perform the control of the first mode, the second mode, or the third mode in accordance with the selection on the operation panel 10.

Figure 27:
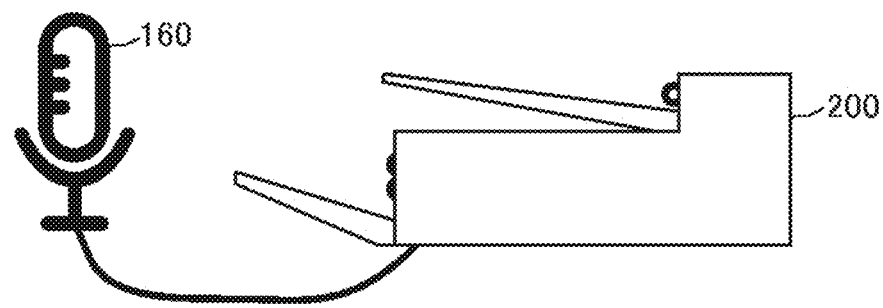
FIG. 27 is a diagram illustrating an example of the operation device to allow a user to select a first mode, a second mode, or a third mode.

As illustrated in FIG. 27, instead of or in addition to the rotary switch 150 and the operation panel 10, a microphone 160 as an audio input mechanism is connected to the sheet laminator 200 or the image forming apparatus 300. When the user inputs voice to the microphone 160, the voice is transmitted to the main controller 500 of, for example, the sheet laminator 200, and each mode can be selected. Switching by voice input allows the user to easily switch the first mode, the second mode, or the third mode.

Next, the second mode according to an embodiment of the present disclosure is described with reference to FIGS. 28 to 33.

The second mode is a mode in which the image forming system 400 performs lamination processing on a sheet set (hereinafter also referred to as an inner-sheet set sheet PS) in which a user sandwiches a sheet medium (e.g., an inner sheet P) between separates sheets of a two-ply sheet (e.g., the lamination sheet S). Accordingly, the user can select a mode in which the inner-sheet set sheet PS is fed in an off-line manner.

In the sheet laminator 200, an operation in a case where the inner-sheet set sheet PS is fed in the second mode is described below.

First, a description is given of an embodiment for setting an operation content according to the type, size, and the like of a sheet fed in the second mode in the sheet laminator 200.

FIGS. 28A, 28B, and 28C are diagrams illustrating the operation panel 10 as an operation device for the user to perform sheet feed setting.

The operation panel 10 illustrated in FIG. 28A has, as adjustment items of "sheet feed setting", film-sheet thickness (in this example, "thick" is selected), inner-sheet thickness (in this example, "plain sheet" is selected), film-sheet size (in this example, "A4" is selected), lamination temperature (in this example, "high" temperature is selected), and lamination speed (in this example, "low" speed is selected).

The operation panel 10 illustrated in FIG. 28B allows the user to set the details of the sheet feed setting and finely adjust values such as film-sheet thickness (μm), inner-sheet thickness (basis weight), film-sheet size (vertical), film-sheet size (horizontal), lamination temperature (° C.), and lamination speed (mm/s) in unit of steps.

In the operation panel 10 of FIG. 28C, in the second mode, the user can set the thickness of the inner-sheet set sheet PS on the operation panel 10. In this example, as illustrated in FIG. 28A, the sheet thickness is not divided into the inner-sheet thickness and the film-sheet thickness, and only the adjustment item of "sheet-set thickness" is provided (in this example, "thick" is selected). In other words, the user can roughly select the thickness of the entire inner-sheet set sheet PS.

According to the embodiment illustrated in FIGS. 28A to 28C, in the second mode, the user can set the thickness of the inner-sheet set sheet PS on the operation panel 10. Accordingly, not only the setting of the film-sheet thickness but also the inner-sheet set sheet considering the inner-sheet thickness can be dealt with, and the proper lamination temperature setting can be performed.

According to the embodiment illustrated in FIGS. 28A to 28C, in the second mode, the user can set the temperature of the lamination processing using the operation panel 10. Thus, the temperature setting can be easily performed with the operation panel 10.

According to the embodiment illustrated in FIGS. 28A to 28C, in the second mode, the user can set the processing speed of the lamination processing using the operation panel 10. Thus, the speed setting can be easily performed with the operation panel 10.

Figure 29A:
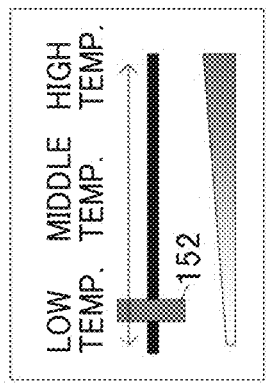
FIGS. 29A and 29B are diagrams illustrating examples of another operation device to allow a user to perform the sheet feed setting.
Figure 29B:
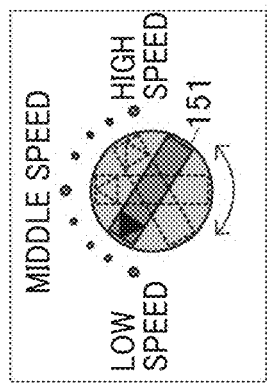

FIGS. 29A and 29B are diagrams illustrating another operation device for the user to perform the sheet feed setting.

In this example, the sheet laminator 200 or the image forming apparatus 300 includes a rotation knob 151 (FIG. 29A) or a switch, and a slide knob 152 (FIG. 29B) instead of the operation panel. The user can adjust the adjustment items using the rotation knob 151 and the slide knob 152. In this example, the rotation knob 151 selects the lamination speed ("low speed", "middle speed", and "high speed"). However, a rotation knob is also provided to select other adjustment items such as the thickness of the inner-sheet set sheet PS. In this example, the slide knob 152 selects the lamination temperature ("low temperature", "middle temperature", and "high temperature"). However, a slide knob is also provided to select other adjustment items such as the thickness of the inner-sheet set sheet PS. Alternatively, a microphone 160 as an operation device illustrated in FIG. 27 may be connected to the sheet laminator 200 or the image forming apparatus 300, and may be set by voice input.

According to the embodiment of FIG. 29B, in the second mode, the user can set the temperature of the lamination processing with the knob. Thus, the temperature setting can be easily performed with the knob.

According to the embodiment of FIG. 29A, in the second mode, the user can set the processing speed of the lamination processing with the knob. Thus, the speed setting can be easily performed with the knob.

Next, the operation of the sheet laminator 200 in the second mode is described below.

Figure 30:
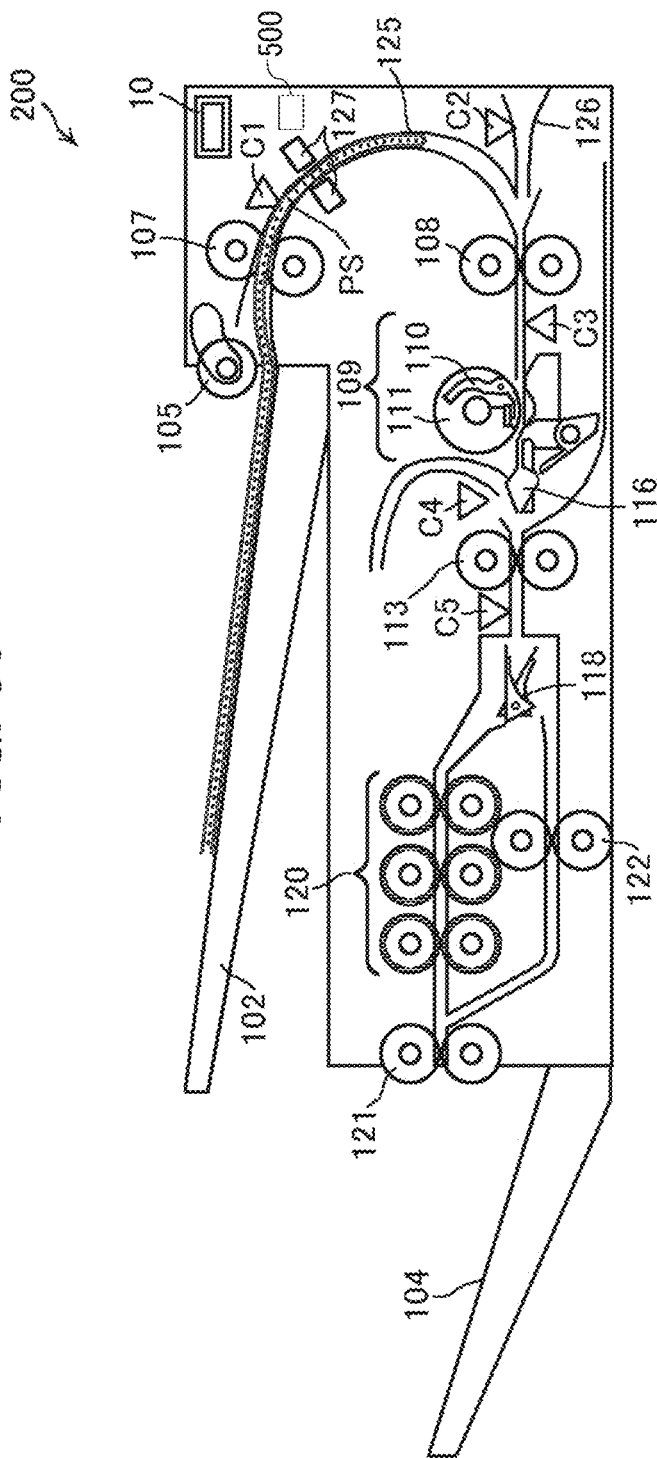
FIG. 30 is a schematic view of a sheet laminator that performs an operation in the second mode, according to an embodiment of the present disclosure.
Figure 31:
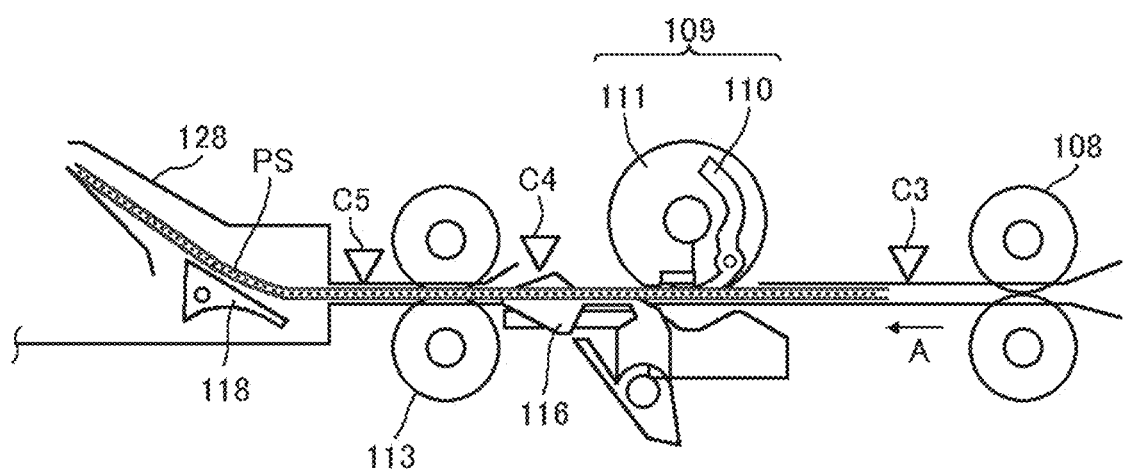
FIG. 31 is a schematic view of the vicinity of a separation mechanism including separation claws in the sheet laminator of FIG. 31.
Figure 32:
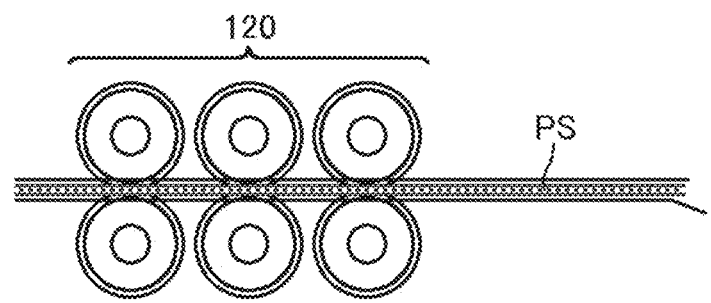
FIG. 32 is a schematic view of the vicinity of heat pressing rollers in the sheet laminator of FIG. 31.

As illustrated in FIG. 30, the sheet laminator 200 feeds an inner-sheet set sheet PS set on the sheet tray 102. Here, the speed at which the inner-sheet set sheet PS is fed and conveyed is a speed determined in advance based on a combination of items of "sheet feed setting". After the inner-sheet set sheet PS is conveyed into the sheet laminator 200, as illustrated in FIG. 31, the inner-sheet set sheet PS is conveyed as it is without being separated by a separation mechanism including, for example, the separation claws 116, and as illustrated in FIG. 32, lamination processing is performed by the heat pressing rollers 120. At this time, the speed and temperature of the lamination processing with the heat pressing rollers 120 follow the "sheet feed setting". In the manual off-line mode of the inner-sheet set sheet PS, the inner-sheet set sheet PS only passes through the separation mechanism.

During this period, since it is not necessary to eject the inner sheet P, the operation of the image forming apparatus 300 is stopped. Thus, the image forming apparatus does not operate as an image forming apparatus main in the off-line mode, thereby contributing to energy saving.

Next, a description is given of an embodiment of a process for newly feeding an inner-sheet set sheet PS when there is a separated lamination sheet S in the sheet laminator 200 in the second mode.

Figure 33:
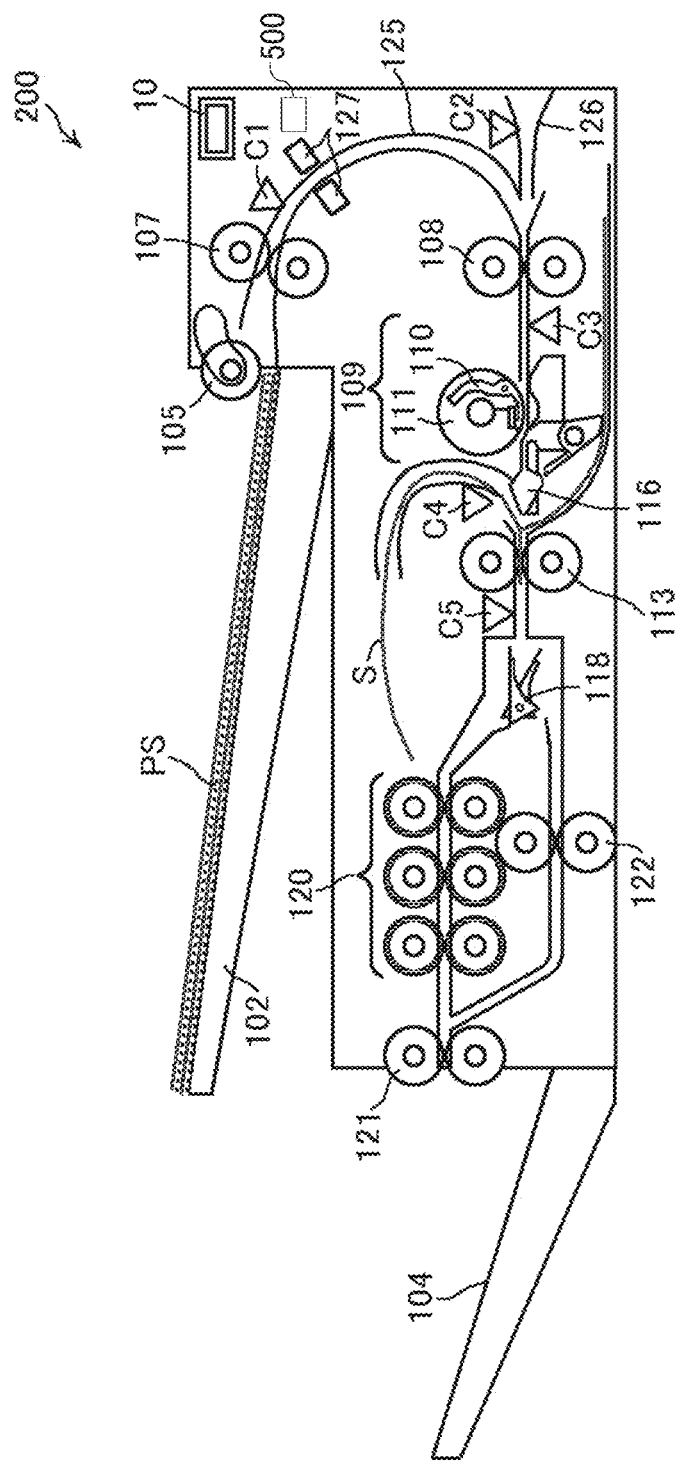
FIG. 33 is a schematic view of the sheet laminator that performs an operation when there is a two-ply sheet that has been separated in the sheet laminator in the second mode.

As illustrated in FIG. 33, the lamination sheet S already present in the sheet laminator 200 at the time of feeding a new inner-sheet set sheet PS is ejected as it is by the rotation of the exit roller pair 113. Such a configuration can obviate the need for the user to remove an excess lamination sheet S in the sheet laminator 200, thereby eliminating downtime associated with the removal operation.

Whether the lamination sheet S already exists in the sheet laminator may be determined by combining any two or more of the conveyance sensors C1 to C5 in the sheet laminator 200.

As described above, the image forming system 400 according to the above-described embodiments of the present disclosure has a first mode in which a printed inner sheet P are fed in-line from the image forming apparatus 300, set between separated sheets of a two-ply sheet (lamination sheet S), and laminated by the heat pressing rollers 120, a third mode in which an inner sheet P is fed off-line from the sheet tray 102 and laminated by the heat pressing rollers 120, and a second mode in which an inner-sheet set sheet PS is fed off-line from the sheet tray 102 and laminated by the heat pressing rollers 120. The image forming system 400 can switch the mode among the first mode, the second mode, and the third mode.

In the second mode, even if the inner sheet P has a shape or a type that cannot be fed from the sheet tray, the user can off-line feed the inner sheet P set as the two-ply sheet S. Accordingly, since the image forming system 400 can function as a laminator that executes only the lamination processing, it is not necessary to prepare a dedicated laminator.

Although the sheet laminator has been mainly described above as an embodiment, embodiments of the present disclosure are not limited to the sheet laminator. A similar configuration can be applied to a sheet processing apparatus in which the heat pressing rollers 120 as a heat presser and the ejection roller 121 disposed downstream from the heat pressing rollers 120 are removed from the sheet laminator 200. The sheet processing apparatus can perform a separating operation and an inserting operation of an inner sheet as sheet processing.

The image forming apparatus 300 illustrated in FIG. 1 may include a sheet processing apparatus instead of the sheet laminator.

Further, an image forming system according to an embodiment of the present disclosure may include an image forming apparatus 300 and one of a sheet processing apparatus or a sheet laminator 200 detachably attached to the image forming apparatus 300. An image forming system according to another embodiment of the present disclosure may further include, for example, at least one of a sheet feeder (a stacker) or a case binding device.

The image forming apparatus 300 uses an electrophotographic method as a method of forming an image, but is not limited thereto, and may use an image forming method such as an inkjet method or a stencil printing method.

In some embodiments, the operation panel 10 may be provided on the image forming apparatus 300 instead of the exterior of the sheet laminator 200.

Although the present disclosure has been described in detail with reference to several embodiments, such embodiments are merely examples, and various modifications may be made without departing from the scope of the present disclosure. For example, some embodiments and advantageous configurations may be combined with each other.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming system, comprising:
   A sheet processing apparatus configured to separate a two-ply sheet in which two sheets are overlaid and bonded together at a portion of the two-ply sheet, and sandwich a sheet medium between the sheets of the two-ply sheet;
   A heat presser configured to heat and press the two-ply sheet;
   An image forming apparatus configured to form an image on the sheet medium; And
   Control circuitry configured to perform:
      A first mode to cause the sheet processing apparatus to sandwich the sheet medium, on which an image has been formed by the image forming apparatus, between the two sheets of the two-ply sheet and cause the heat presser to laminate the two-ply sheet; and
      A second mode to cause the heat presser to laminate a sheet set that includes the sheet medium sandwiched between the two sheets of the two-ply sheet by a user,
   Wherein the control circuitry is configured to switch between the first mode and the second mode based on input from the user,
   Wherein, in the first mode, the control circuitry is configured to form the image on the sheet medium using the image forming apparatus, and
   Where, in the second mode, the image forming system does not operate the image forming apparatus and the control circuitry does not form the image on the sheet medium using the image forming apparatus.

2. The image forming system according to claim 1, wherein the control circuitry is configured to perform a third mode of causing the sheet processing apparatus to feed the two-ply sheet and the sheet medium from a sheet loader of the sheet processing apparatus and sandwich the sheet medium between the two sheets of the two-ply sheet, and causing the heat presser to laminate the two-ply sheet.

3. The image forming system according to claim 1, wherein the sheet processing apparatus includes a separation mechanism,
   wherein the control circuitry is configured to cause the separation mechanism not to perform separation of the sheet set in the second mode.

4. The image forming system according to claim 2, wherein the control circuitry is configured to stop an operation of the image forming apparatus in the second mode or the third mode.

5. The image forming system according to claim 1, further comprising a switch or a button to allow the user to select the first mode, the second mode, or the third mode.

6. The image forming system according to claim 1, further comprising an operation panel to allow the user to select the first mode, the second mode, or the third mode.

7. The image forming system according to claim 1, further comprising an audio input mechanism configured to allow the user to select the first mode, the second mode, or the third mode by voice input.

8. The image forming system according to claim 6,
wherein the second mode is to allow the user to set a thickness of the sheet set by using the operation panel or a knob.

9. The image forming system according to claim 6,
wherein the second mode is to allow the user to set a temperature of laminating the two-ply sheet by using the operation panel or a knob.

10. The image forming system according to claim 6,
wherein the second mode is to allow the user to set a processing speed of the laminating the two-ply sheet by using the operation panel or a knob.

11. The image forming system according to claim 1,
Wherein the sheet processing apparatus includes a separation mechanism,
Wherein the control circuitry is configured to cause the separation mechanism not to perform separation of the sheet set in the second mode.

\* \* \* \* \*